US00RE44087E

(19) United States
(12) Reissued Patent
Driscoll, Jr. et al.

(10) Patent Number: US RE44,087 E
(45) Date of Reissued Patent: Mar. 19, 2013

(54) PRESENTING PANORAMIC IMAGES WITH GEOMETRIC TRANSFORMATION

(75) Inventors: Edward Driscoll, Jr., Portola Valley, CA (US); Howard Morrow, Missoula, MT (US); Alan J. Steinhauer, Fresno, CA (US); Willard Curtis Lomax, Sunnyvale, CA (US)

(73) Assignee: B.H. Image Co. LLC, Wilmington, DE (US)

(21) Appl. No.: 13/015,142

(22) Filed: Jan. 27, 2011
(Under 37 CFR 1.47)

Related U.S. Patent Documents

Reissue of:
(64) Patent No.: 7,486,324
Issued: Feb. 3, 2009
Appl. No.: 10/419,283
Filed: Apr. 17, 2003

U.S. Applications:
(62) Division of application No. 09/521,652, filed on Mar. 8, 2000, now Pat. No. 6,593,969, which is a division of application No. 08/872,525, filed on Jun. 11, 1997, now Pat. No. 6,459,451.

(60) Provisional application No. 60/020,292, filed on Jun. 24, 1996.

(51) Int. Cl.
*H04N 5/225* (2006.01)

(52) U.S. Cl. ..... 348/335; 348/143

(58) Field of Classification Search ..... 348/335, 348/143
See application file for complete search history.

(56) References Cited

U.S. PATENT DOCUMENTS

| | | | |
|---|---|---|---|
| 2,146,662 | A | 2/1939 | Van Albada |
| 2,244,235 | A | 6/1941 | Ayres |
| 2,304,434 | A | 12/1942 | Ayres |
| 2,628,529 | A | 2/1953 | Braymer |
| 2,654,286 | A | 10/1953 | Cesar |
| 3,203,328 | A | 8/1965 | Brueggeman |
| 3,205,777 | A | 9/1965 | Benner |
| 3,229,576 | A | 1/1966 | Rees |
| 3,692,934 | A | 9/1972 | Herndon |
| 3,723,805 | A | 3/1973 | Scarpino et al. |
| 3,785,715 | A | 1/1974 | Mecklenborg |
| 3,832,046 | A | 8/1974 | Mecklenborg |
| 3,846,809 | A | 11/1974 | Pinzone et al. |
| 3,872,238 | A | 3/1975 | Herndon |
| 3,934,259 | A | 1/1976 | Krider |

(Continued)

FOREIGN PATENT DOCUMENTS

| | | |
|---|---|---|
| CA | 2140681 | 12/1995 |
| CA | 2140681 A1 | 12/1995 |

(Continued)

OTHER PUBLICATIONS

Anderson, R.L., et al., "Omnidirectional Real time Imaging Using Digital Restoration". High Speed Photography SPIE. vol. 348. San Diego, CA. 1982. pp. 807-814.

(Continued)

*Primary Examiner* — Tuan Ho

(57) ABSTRACT

Most camera systems only record an image from a limited viewing angle. A new panoramic camera apparatus is disclosed that instantaneously captures a 360 degree panoramic image. In the camera device, virtually all of the light that converges on a point in space is captured. Specifically, in the camera of the present invention, light striking this point in space is captured if it comes from any direction, 360 degrees around the point and from angles 50 degrees or more above and below the horizon. The panoramic image is recorded as a two dimensional annular image. Furthermore, various different systems for displaying the panoramic images and distributing the panoramic images. Specifically, methods and apparatus for digitally performing a geometric transformation of the two dimensional annular image into rectangular projections such that the panoramic image can be displayed using conventional methods such as printed images and televised images.

49 Claims, 20 Drawing Sheets

U.S. PATENT DOCUMENTS 3,970,841 A 7/1976 Green
3,998,532 A 12/1976 Dykes
4,012,126 A 3/1977 Rosendahl et al.
4,017,145 A 4/1977 Jerie
4,038,670 A 7/1977 Seitz
4,058,831 A 11/1977 Smith
4,078,860 A 3/1978 Globus et al.
4,157,218 A 6/1979 Gordon et al.
4,190,866 A 2/1980 Luknar
4,241,985 A 12/1980 Globus et al.
D263,716 S 4/1982 Globus et al.
4,326,775 A 4/1982 King
4,395,093 A 7/1983 Rosendahl et al.
4,429,957 A 2/1984 King
4,463,380 A 7/1984 Hooks, Jr.
4,484,801 A 11/1984 Cox
4,518,898 A 5/1985 Tarnowski et al.
4,549,208 A 10/1985 Kamejima et al.
4,561,733 A 12/1985 Kreischer
4,566,763 A 1/1986 Greguss
4,578,682 A 3/1986 Hooper et al.
4,593,982 A 6/1986 Rosset
4,602,857 A 7/1986 Woltz et al.
4,656,506 A 4/1987 Ritchey
4,661,855 A 4/1987 Gulck
4,670,648 A 6/1987 Hall et al.
4,728,839 A 3/1988 Coughlan et al.
4,736,436 A 4/1988 Yasukawa et al.
4,742,390 A 5/1988 Francke et al.
4,751,660 A 6/1988 Hedley
4,754,269 A 6/1988 Kishi et al.
4,761,641 A 8/1988 Schreiber
4,772,942 A 9/1988 Tuck
4,797,942 A 1/1989 Burt
4,807,158 A 2/1989 Blanton et al.
4,835,532 A 5/1989 Fant
4,858,002 A 8/1989 Zobel
4,858,149 A 8/1989 Quarendon
4,864,335 A 9/1989 Corrales
4,868,682 A 9/1989 Shimizu et al.
4,899,293 A 2/1990 Dawson et al.
4,901,140 A 2/1990 Lang et al.
4,907,084 A 3/1990 Nagafusa
4,908,874 A 3/1990 Gabriel
4,918,473 A 4/1990 Blackshear
4,924,094 A 5/1990 Moore
4,943,821 A 7/1990 Gelphman et al.
4,943,851 A 7/1990 Lang et al.
4,945,367 A 7/1990 Blackshear
4,965,844 A 10/1990 Oka et al.
D312,263 S 11/1990 Charles
4,974,072 A 11/1990 Hasegawa
4,985,762 A 1/1991 Smith
4,991,020 A 2/1991 Zwirn
5,005,083 A 4/1991 Grage et al.
5,020,114 A 5/1991 Fujioka et al.
5,021,813 A 6/1991 Corrales
5,023,725 A 6/1991 McCutchen
5,038,225 A 8/1991 Maeshima
5,040,055 A 8/1991 Smith
5,048,102 A 9/1991 Tararine et al.
5,051,830 A 9/1991 Von Hoessle
5,067,019 A 11/1991 Juday et al.
5,068,735 A 11/1991 Tuchiya et al.
5,077,609 A 12/1991 Manelphe
5,083,389 A 1/1992 Alperin
5,097,325 A 3/1992 Dill
5,115,266 A 5/1992 Troje
5,130,794 A 7/1992 Ritchey
5,142,354 A 8/1992 Suzuki et al.
5,153,716 A 10/1992 Smith
5,157,491 A 10/1992 Kassatly
5,166,878 A 11/1992 Poelstra
5,173,948 A 12/1992 Blackham et al.
5,175,808 A 12/1992 Sayre
5,185,667 A 2/1993 Zimmermann
5,187,571 A 2/1993 Braun et al.
5,189,528 A 2/1993 Takashima et al.
5,200,818 A 4/1993 Neta et al.
5,231,673 A 7/1993 Elenga
5,235,656 A 8/1993 Hilgeman
5,259,584 A 11/1993 Wainwright
5,262,852 A 11/1993 Eouzan et al.
5,262,867 A 11/1993 Kojima
5,280,540 A 1/1994 Addeo et al.
5,289,312 A 2/1994 Hashimoto et al.
5,305,035 A 4/1994 Schonherr et al.
5,311,572 A 5/1994 Friedes et al.
5,313,306 A 5/1994 Kuban et al.
5,315,331 A 5/1994 Ohshita
5,341,218 A 8/1994 Kaneko et al.
5,359,363 A 10/1994 Kuban et al.
5,384,588 A 1/1995 Martin et al.
5,396,583 A 3/1995 Chen et al.
5,422,987 A 6/1995 Yamada
5,432,871 A 7/1995 Novik
5,444,476 A 8/1995 Conway
5,446,833 A 8/1995 Miller et al.
5,452,450 A 9/1995 Delory
5,473,474 A 12/1995 Powell
5,479,203 A 12/1995 Kawai et al.
5,490,239 A 2/1996 Myers
5,495,576 A 2/1996 Ritchey
5,508,734 A 4/1996 Baker et al.
5,530,650 A 6/1996 Biferno et al.
5,539,483 A 7/1996 Nalwa
5,550,646 A 8/1996 Hassan et al.
5,563,650 A 10/1996 Poelstra
5,601,353 A 2/1997 Naimark et al.
5,606,365 A 2/1997 Maurinus et al.
5,610,391 A 3/1997 Ringlien
5,612,533 A 3/1997 Judd et al.
5,627,675 A 5/1997 Davis et al.
5,631,778 A 5/1997 Powell
5,633,924 A 5/1997 Kaish et al.
5,649,032 A 7/1997 Burt et al.
5,682,511 A 10/1997 Sposato et al.
5,684,937 A 11/1997 Oxaal
5,686,957 A 11/1997 Baker
5,714,997 A 2/1998 Anderson
5,729,471 A 3/1998 Jain et al.
5,748,194 A 5/1998 Chen
5,760,826 A 6/1998 Nayar
5,761,416 A 6/1998 Mandal et al.
5,764,276 A 6/1998 Martin et al.
5,796,426 A 8/1998 Gullichsen et al.
5,841,589 A 11/1998 Davis et al.
5,844,520 A 12/1998 Guppy et al.
5,850,352 A 12/1998 Moezzi et al.
5,854,713 A 12/1998 Kuroda et al.
5,877,801 A 3/1999 Martin et al.
RE36,207 E 5/1999 Zimmermann et al.
5,903,319 A 5/1999 Busko et al.
5,920,337 A 7/1999 Glassman et al.
5,990,941 A 11/1999 Jackson et al.
6,002,430 A 12/1999 McCall et al.
6,034,716 A 3/2000 Whiting et al.
6,043,837 A 3/2000 Driscoll et al.

FOREIGN PATENT DOCUMENTS

EP 0 816 891 A1 1/1998
EP 0816891 A1 1/1998
FR 1234341 5/1960
FR 1234341 10/1960
GB 2 221 118 A 1/1990
GB 2 289 820 11/1995
GB 2289820 11/1995
JP 02-127877 11/1988
JP 07-151965 6/1995
JP 09-133877 5/1997
JP 2-127877 11/1998
WO WO-94/01300 6/1994
WO WO 94/13100 6/1994
WO WO-94/17493 8/1994
WO WO 94/17493 A1 8/1994
WO WO-97/31482 8/1997

| | | |
|---|---|---|
| WO | WO 97/31482 | 8/1997 |
| WO | WO-01/06449 | 1/2001 |
| WO | WO 01/06449 A1 | 1/2001 |

OTHER PUBLICATIONS

Carlbom, Ingrid et al. "Planner Geometric Projections and Viewing Transformations". Computing Surveys. vol. 10. No. 04. Dec. 1978. pp. 465-502.
Castleman, K., "Digital Image Processing". Prentice Hall. 1979. pp. 110-135, 383-400,408.
Castleman, K., "Digital Image Processing". Prentice Hall. 1996. pp. 125-127, 140-141.
Chang, Yuh-Lin et al., "Calibrating a Mobile Camera's Parameters". Pattern Recognition. vol. 26. No. 01. Dated: 1983. pp. 75-88.
Charles et al., "How to Build and Use an All-Sky Camera." Astronomy. Apr. 1987. pp. 64-70.
Charles Jeffery, R., "All-Sky Reflector with "Invisible" Camera Support". Images from 1988 RTMC Proceedings. pp. 79-80.
Chen, Shenchang Eric. Quick Time VR—An Image-Based Approach to Virtual Environment Navigation. pp. 39. Dated: 1995.
Cnoe M. And Kuno Y., "Digital Processing CF Images Taken by Fish-Eye Lens". 1982. IEEE. pp. 105-108.
Defendant IPI's Composite Exhibit List, Civil Action of *interactive Pictures Corporation, F/K/A Omniview, Inc.* v. *Infinite Pictures, Inc. and Bill Tillman,* Case No. 3-96-849. Filed: Jan. 5, 1998, in U.S.D.C., Eastern District of Tennessee. pp. 20.
Defendants IPI's Notice of Reliance of Prior Art and Witnesses, Civil Action of *Interactive Pictures Corporation, A/K/A Omniview, Inc.* v. *Infinite Pictures, Inc. and Bill Tillman,* Case No. 3-96-849; 05 pages. Filed: Dec. 8, 1997, in U.S.D.C., Eastern District of Tennessee.
Deutsch, Claudia H., "One Camera That Offers Many Views," The New York Times, Feb. 3, 1997, 2 pages, Retrieved from: http://www.nytimes.com/1997/02/03/business/one-camera-that-offers-many-views.html.
Dixon, D., Golin, S., and Hasfield, I., "DVI Video/Graphics". Computer Graphics World reprinted from the Jul. 1987 edition of Computer Graphics World. pp. 4.
Fant, K., "A Nonaliasing, Real-Time Spatial Formation Technique". IEEE. 1986. pp. 71-80.
Fisher, Timothy E., A Programmable Video Image Remapper. SPIE> vol. 938. pp. 122-128. Dated: 1988.
Fu, K.S. et al., "Low-Level Vision". Robotics: Control, Sensing, Vision, and Intelligence. 1987.McGraw Hill Inc., pp. 313-315.
Greene, N., "Environment Mapping and Other Applications of the World Projections." Computer Graphics and Applications. Nov. 1986. IEEE Computer Society. vol. 06. No. 11. pp. 21-29.
Greene, N., and Heckbert, P., "Creating Raster Omnimax Images From Multiple Perspective Views Using The Elliptical Weighted Average Filter". IEEE. 1986. pp. 21-27.
Greene, William B., "Qualitative Image Processing Techniques". Digital Image Processing, A Systems Approach. 2.sup.nd Edition. 1989. Van Nostrand Reinhold. pp. 92-112.
Hamit, F., "Near- Fisheye CCD Camera Broadens View for Imaging". Advanced Imaging. Mar. 1993. pp. 50-52.
Hechbert P., "The PMAT and Poly User's Manual". Computer Graphics Lab. N.Y.I.T., Feb. 18, 1983. pp. 1-29.
Heckbert, P., "Survey of Texture Mapping" IEEE CG&A, Nov. 1986, pp. 56-67.
Heckbert, P., Fundamentals of Textured Mapping and Image Warping. Master Thesis. pp. 86. Dated: Jun. 17, 1989.
International Broadcasting Convention Venue RAI Congress and Exhibition Centre, Amsterdam, The Netherlands. Jul. 3-7, 1992. pp. 6, Including the title page.
Johnson, Colin R., "Imaging System Sees All". Electronic Engineering Times. Dec. 25, 1996. pp. 1&98.
Laikin, Milton. "Wide Angle Lens System". 1980. International Design Conference (OSA). SPIE. vol. 237. 1980. pp. 530-532, 815-816.
Lenz, Reimer K. et al., "Techniques for Calibration of the Scale Factor and Image Center for High Accuracy 3-D Machine Vision Metrology". IEEE. Transaction on Pattern Analysis and Machine Intelligence. vol. 05. No. 05. Sep. 1988. pp. 713-720.
Lippman, Andrew. Movie-Map: An Application Of The Optical Videodisc To Computer Graphics. pp. 43. Dated: 1980.
Lu Carnevale, Mary. Video Camera Puts The Viewer in Control. Wall Street Journal. Dated: Nov. 25, 1992.
Marbach, William D. (edited by): Developments To Watch. Business Week. p. 83. Dated: Sep. 26, 1988.
Miyamoto, K., "Fish Eye Lens". JOSA. vol. 54. pp. 1060-1061. Dated: Aug. 1964.
Nomura, Yoshihiko, et al., "A Simple Calibration Algorithm for High-Distortion Lens Camera". IEEE. Transaction on Pattern Analysis and Intelligence Machine. vol. 14. No. 11. Nov. 1992. pp. 1095-1099.
Non-Final Office Action received for U.S. Appl. No. 10/419,283 dated Sep. 19, 2006.
Notice of Allowance received for U.S. Appl. No. 10/419,283 dated Sep. 26, 2008.
Office Action received for Japanese Appln. No. 2000-341825 dated Aug. 3, 2010. (English Translation attached).
Plaintiff's Rule 26(a)(3) Disclosures, Civil Action of *Interactive Pictures Corporation, F/K/A Omniview, Inc.* v. *Infinite Pictures, Inc. and Bill Tillman,* Case No. 3-96-849. Filed: Dec. 8, 1997 in U.S.D.C. Eastern District of Tennessee. pp. 31.
Plaintiff's Supplemental Trial Exhibit List, Civil Action of *Interactive Pictures Corporation, F/K/A Omniview, Inc.* v. *Infinite Pictures, Inc. and Bill Tillman,* Case No. 3-96-849; 41 pages. Filed: Jan. 2, 1998, in U.S.D.C., Eastern District of Tennessee.
Popular Science. Electronic Panning Camera System. pp. 36-37. Dated: Sep. 1992.
Rebiai,M., Mansouri,S., Pinson,F., and Tichit, B., "Image Distortion From Zoom Lenses: Modeling and Digital Correction". International Broadcasting Convention. IEEE. Dated: Jul. 1992.
Ripley G. David, "DVI—A Digital Multimedia Technology". Communication of the ACM. Jul. 1989. vol. 32. No. 07. pp. 811-820.
Roger W. Sinnott, "Scientific Library Gleaning for ATMs". Sky & Telescope. Aug. 1986. pp. 186.
Shah, S., A Simple Calibration Procedure for Fish-Eye (High Distortion) Lens. IEEE. 1994. pp. 3422-3427.
Shah, Shisir et al., "Depth Estimation using Fish-Eye Lenses". IEEE. Department of Electrical and Computer Engineering. University of Texas. 1994. pp. 740-744.
Snyder, J. P. "Map Projections—A Working Manual," U. S. Geological Survey Professional Paper 1395. Washington, DC: U. S. Government Printing Office, pp. 164-168, 1987.
Spice, B., "Panospheric Camera Expands Horizon," Pittsburgh Post—Gazette, Jun. 2, 1997, 3 pages.
Tsai, Roger Y., "A Versatile Camera Calibration Technique for High Accuracy 3-D Machine Vision Using Off-the-Shelf TV Cameras and Lenses". IEEE. Journal of Robotics and Automation. vol. RA-3. No. 04. Aug. 1987. pp. 323-344.
Tulloch, Martha. "New Video Camera . . . " Photonics Spectra. pp. 18-20. Dated: Oct. 1992.
Upstill, Steve. "Building Stronger Images". UNIX Review. Oct. 1988. vol. 06. No. 10. pp. 63-73.
Verity, John W. (edited by): Information Processing. Business Week. p. 134E. Dated: Jul. 13, 1992.
Weng, Juyang. "Camera Calibration With Distortion Models and Accuracy". IEEE. Transactions on Pattern Analysis and Machine Intelligence. vol. 14. No. 10. Oct. 1992. pp. 965-980.
Wolberg, George. Digital Image Warping (Introduction). 1990. IEEE Computer Society Press. pp. 2.
Yelick, Steven. Anamorphic Image Processing. pp. 1-37, Including Acknowledgement Page. Dated: 1980.
Supplemental Information Disclosure Statement in re: the Application of Steven D. Zimmerman, et al. U.S. Appl. No. 08/662,410; 08 Pages including PTO 1449 Form citing 19 references U.S. Appl. No. 08/662,410, filed Jul. 12, 1996.
Plaintiff's Rule 26(a)(3) Disclosures, Civil Action of *Interactive Pictures Corporation, F/K/A Omniview, Inc.* v. *Infinite Pictures, Inc. and Bill Tillman,* Case No. 3-96-849; 31 Pages. Filed: Dec. 8, 1997, in U.S.D.C., Eastern District of Tennessee.
Greene, William B., "Qualitative Image Processing Techniques". Digital Image Processing, A Systems Approach. 2nd Edition. 1989. Van Nostrand Reinhold. pp. 91-112.
Defendant's IPI's Composite Exhibit List, Civil Action of *Interactive Pictures Corporation, F/K/A Omniview, Inc.* v. *Infinite Pictures, Inc. and Bill Tillman.* Case No. 3-96-849. Filed: Jan. 5, 1998 in U.S.D.C., Eastern District of Tennessee. pp. 20.

PRESENTING PANORAMIC IMAGES WITH GEOMETRIC TRANSFORMATION

Matter enclosed in heavy brackets [ ] appears in the original patent but forms no part of this reissue specification; matter printed in italics indicates the additions made by reissue.

CLAIM OF PRIORITY

[This is a divisional of co-pending application Ser. No. 09/521,652 filed Mar. 8, 2000 which is a divisional of co-pending application Ser. No. 08/872,525, filed Jun. 11, 1997 which claims the benefit of U.S. Provisional Application No. 60/020,292, filed Jun. 24, 1996.] *This application is a broadening Reissue application of U.S. patent application Ser. No. 10/419,283 filed Apr. 17, 2003 (now U.S. Pat. No. 7,486,324, granted Feb. 3, 2009), which is a Divisional of U.S. patent application Ser. No. 09/521,652, filed Mar. 8, 2000 (now U.S. Pat. No. 6,593,969), which is a Divisional of U.S. patent application Ser. No. 08/872,525, filed Jun. 11, 1997 (now U.S. Pat. No. 6,459,451), which claims the benefit of U.S. Provisional Application No. 60/020,292, filed Jun. 24, 1996.*

FIELD OF THE INVENTION

The present invention relates to the field of film and video photography. In particular the present invention discloses a camera device that captures a 360 degree panoramic image and display systems for displaying the panoramic image captured by the camera device.

BACKGROUND OF THE INVENTION

Most cameras only provide a small viewing angle. Thus, a typical conventional camera only captures an image in the direction that the camera is aimed. Limited view cameras force viewers to look only at what the camera operator chooses to focus on. Some cameras use a specialized wide angle lens to capture a wider panoramic image, but such panoramic cameras still have a limited field of view.

It would be desirable to have a camera system that would capture the light from all directions such that a full 360 degree panoramic image can be created. A full 360 degree panoramic image would allow the viewer to choose what she would like to look at. Furthermore, a full 360 degree panoramic image allows multiple viewers to simultaneously view the world from the same point, with each being able to independently choose their viewing direction and field of view.

At the present time, there are some known methods of creating 360 degree panoramic images. However, most current methods are subject to limitations due to their physical movements and mechanical complexity. For example, some of the current methods operate by combining a series of individual photographs taken in different directions into a single panoramic image. Some panoramic cameras spin a lens and film to capture a panoramic view in a single sweeping motion.

There is a market for panoramic photos to be used in multimedia applications, typically provided on CD-ROMs. In the last few years, some software manufacturers have introduced standards for digital storage and computer playback of panoramic datasets. One example is QuickTime® VR, introduced by Apple® Computer, Inc. Apple® Computer's QuickTime® VR standard governs the file storage format and the playback software needed to view their datasets.

Currently, Apple Computer recommends and provides software tools to implement a labor-intensive process for capturing these panoramic datasets. In the Apple QuickTime® VR (QTVR) process a standard 35 mm camera is mounted vertically on a leveled tripod and equipped with an extreme wide angle lens (e.g. 15-18 mm focal length). A sequence of twelve or more overlapping still photographs is taken at roughly 30 degree intervals as the camera is turned on the tripod around a vertical axis. These photographs are developed, digitized and then fed into a semi-automated software program called a "stitcher" that merges the overlapping still photographs into one long panoramic strip.

The labor intensive process suffers from a number of shortcomings. First, the process is time-consuming since many steps require human intervention and guidance. Furthermore, the recommended process is prone to temporal artifacts since it captures each individual photo at a different time. This means that the "stitched" pan image is not instantaneous but rather is made up of individual photos taken at different times. The time change during the series of photographs makes it nearly impossible to create panoramic images in changing scenes containing shorelines, urban crowds and traffic, windblown trees, etc. Finally, it is difficult to see how the image capture method recommended by Apple QuickTime® VR (QTVR) can be extended from a single still panoramic image into a continuous frame, or motion picture panoramic image capture.

SUMMARY OF THE INVENTION

The present invention discloses a camera device that instantaneously captures a 360 degree panoramic image. Furthermore, the present invention discloses various different systems for displaying the panoramic images.

In the camera device, virtually all of the light that converges on a point in space is captured. Specifically, in the camera of the present invention, light striking this point in space is captured if it comes from any direction, 360 degrees around the point and from angles 50 degrees or more above and below the horizon as illustrated in FIG. 1.

Other objects, features and advantages of present invention will be apparent from the company drawings and from the detailed description that follows below.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for a camera device that instantaneously captures 360 degree panoramic images is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Charge Coupled Devices. However, the panoramic camera system can easily be implemented with other types of electronic image capture systems.

The Basic Panoramic Camera Design

Figure 1:
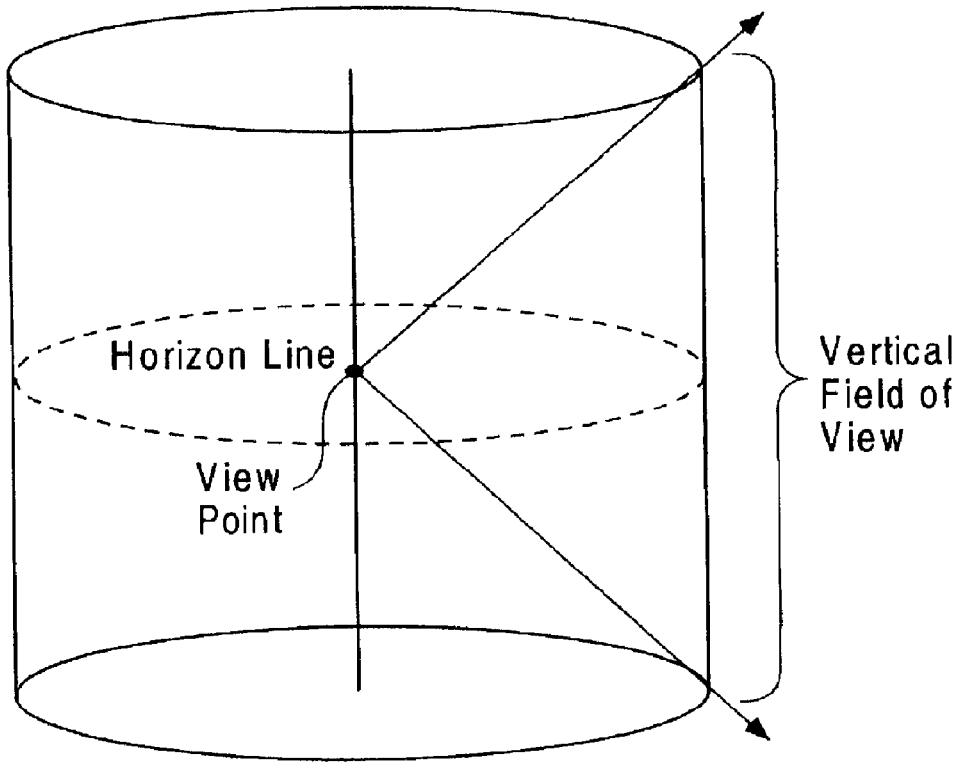
FIG. 1 illustrates the panoramic surroundings that are captured by the panoramic camera system of the present invention.
Figure 2A:
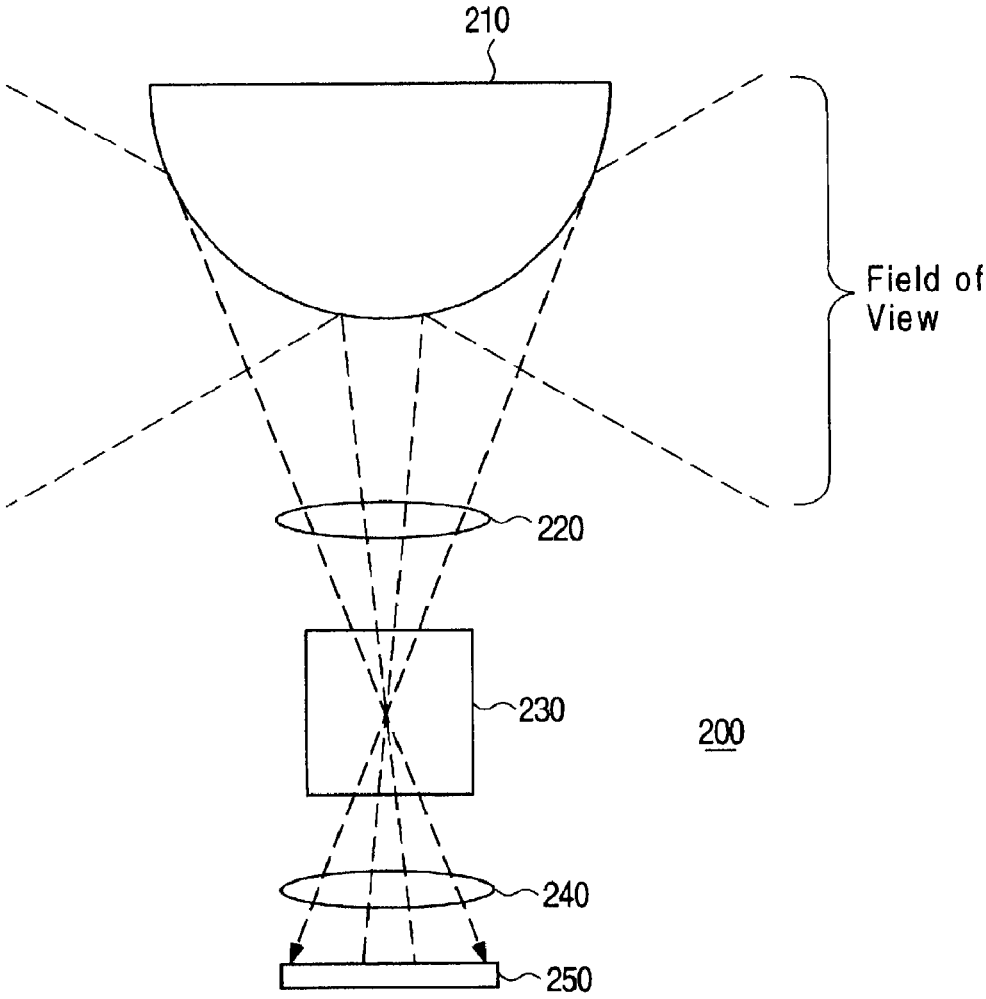
FIG. 2a illustrates a schematic diagram of the panoramic camera system of the present invention.

The panoramic camera design of the present invention captures light from all directions within 50 to 60 degrees above and below the horizon simultaneously. FIG. 1 graphically illustrates the cylindrical panoramic view of which the panoramic camera system captures an image. To capture all the light of the panorama and generate a two dimensional representation that may easily be recorded, the present invention uses a carefully designed and engineered collection of mirrors and lenses. The basic design of the panoramic camera of the present invention is illustrated in FIG. 2a. Each element of the panoramic camera will be described individually.

The Mirror

Figure 3A:
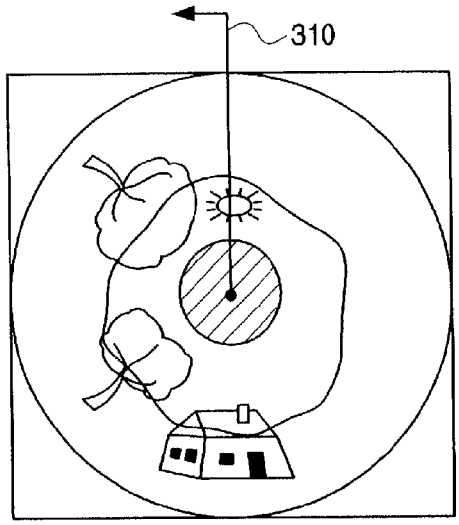
FIG. 3a illustrates an example of an annular image captured by the panoramic camera system of the present invention.

Referring to FIG. 2a, the panoramic camera of the present invention collects light using a convex mirror 210 that is in the approximate shape of parabolic cone. In one embodiment of the present invention, the tip of the convex mirror 210 is pointed downward as illustrated in FIG. 2a. When the convex mirror 210 is viewed from below, the parabolic mirror 210 presents an annular image of the surrounding panorama as illustrated in FIG. 3a. However, the annular image is distorted and suffers from optical defects due to the shape of the convex mirror 210.

The distortion in the image is partly due to the fact that the convex mirror 210 of the imaging system effectively converts the surrounding panorama to a polar coordinate system. By adjusting the shape of the convex mirror 210, the mapping of the elevation angle of incoming light to radial distance in the annular image, can be controlled.

Figure 2B:
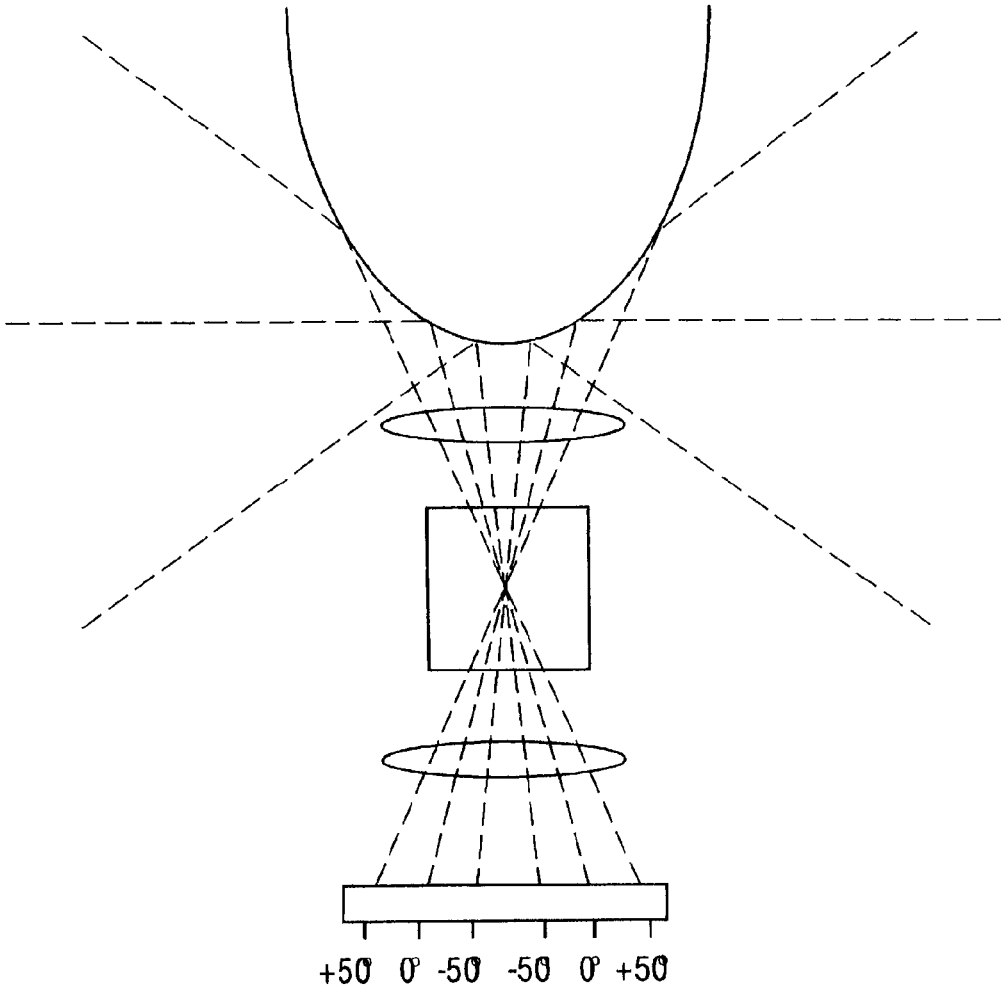
FIG. 2b illustrates a schematic diagram of the panoramic camera system of the present invention with a parabolic mirror.
Figure 2C:
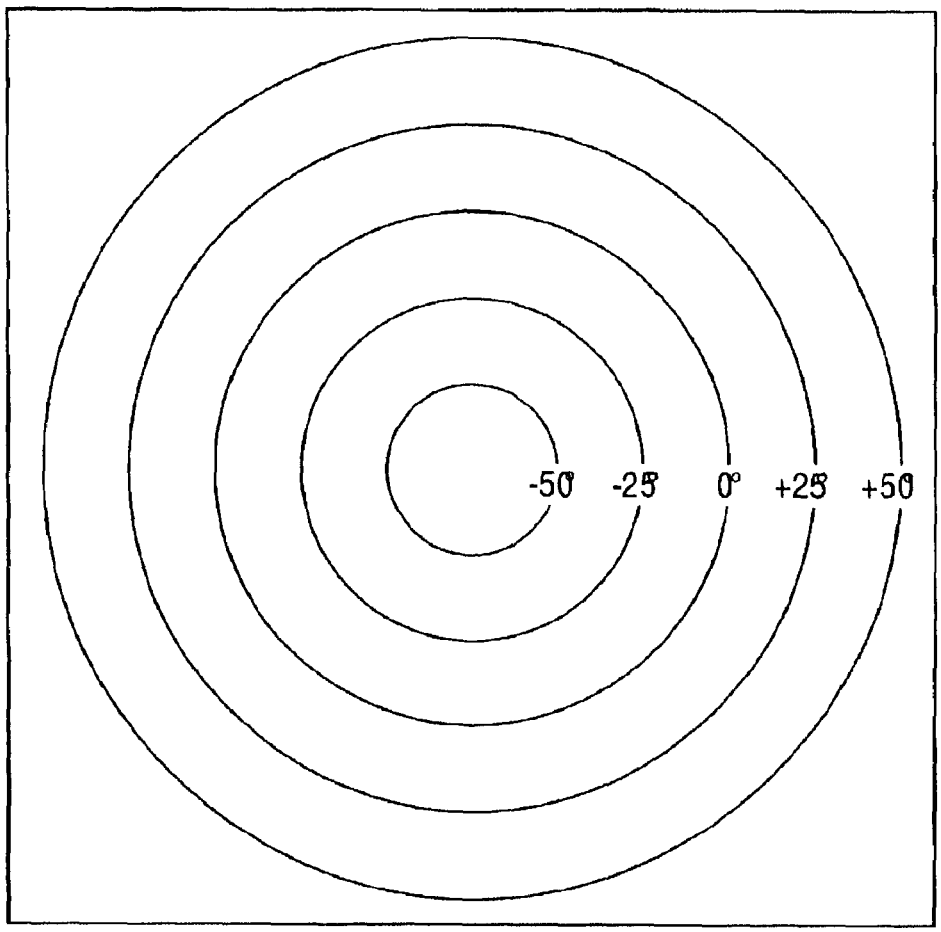
FIG. 2c illustrates an annular image captured by the panoramic camera system of the FIG. 2b wherein the incident angle is linearly proportional to the radial distance of the annular image.

In a preferred embodiment, the convex mirror 210 is a parabolic mirror that creates an annular image wherein the radial distance from the center of the annular image is linearly proportional to the angle of incident light. A panoramic camera system with a parabolic mirror is illustrated in FIG. 2b. Note that in the image plane of FIG. 2b, the distance from the center is linearly proportional to the angle of incident light. This concept is more clearly illustrated in FIG. 2c, wherein the concentric circles represent different angles of incident light.

The Astigmatism Correction Lens

The convex mirror of the present invention introduces other image defects that require careful correction. One particular problem is astigmatism. Specifically, the light reflected downward from the convex mirror 210 of the present invention will not meet at a single focal point. To correct for this problem, an astigmatism correction lens 220 is added to correctly focus the light from the convex mirror 210.

The astigmatism correction lens 220 comprises a group of 2 or more lenses whose group focal length is long but with individual elements of strong and opposite power. Thus, the astigmatism lens group may be made of the same optical material without introducing significant lateral color. Since the beam size associated with any object point in space to be imaged is quite small compared to the field of the beam, the strong elements tend to introduce deleterious amounts of spherical aberration or coma into the final image.

The Objective Lens

The next component is a standard camera objective lens 230. The standard camera objective lens 230 forms an image using the astigmatism-corrected, reflected light from the convex mirror 210. In the present embodiment, a standard off-the-shelf camera lens is used that is optimized for cost and performance in the conventional photography market. The current embodiment relies upon a pre-defined focal length.

The focal length of the standard objective lens is selected based on two factors. The first factor is the maximum angular field of view present by the convex mirror and astigmatism correction lens group. This factor is determined by the largest angle away from the horizon of an object to be captured. The second factor is the maximum diameter of the circular image to be recorded. In an embodiment that uses 35 mm film, this value would not exceed 24 mm. In an embodiment that uses Charged Coupled Device arrays, the objective lens must keep the circular image within the bounds of the CCD array.

For one preferred embodiment, the appropriate focal length is 22 mm. Since there are many objective lenses available with focal lengths in the 18 mm to 24 mm range, this focal length provides many off-the-shelf lens choices.

To allow a standard off-the-shelf camera lens to be used, the present invention "false focuses" the image beyond the normal focal plane. This allows the next optical element (field flattening lens) to fit between the objective lens 230 and the image plane 250.

The Field Flattening Lens

Another optical problem created by the parabolic mirror is a curved image field that is created by the curve of the parabolic mirror. The curved image field problem is solved by adding yet another lens 240. This final lens is a "field flattening" lens, that flattens the field of optimal focus to a flat two dimensional image plane. The field flattening lens 240 must be kept as close to the image plane as practical to eliminate the need for a focal plane shutter.

In one embodiment, the material SFL6 is used to create the field flattening lens 240. Due to its high index of refraction, SFL6 allows the field flattening lens 240 to be approximately 2 millimeters thick. If the field flattening lens 240 was created using more traditional materials, the field flattening lens 240 would be approximately 4.5 millimeters thick.

The Image Capture System

The final major component of the panoramic camera design is the image capture mechanism 250. The image capture mechanism 250 is placed at the image plane just beneath the field flattening lens 240. This mechanism captures the optimized two dimensional annular image of the surrounding panorama. An example of a captured panorama stored as a two dimensional annular representation is shown in FIG. 3a.

Figure 4A:
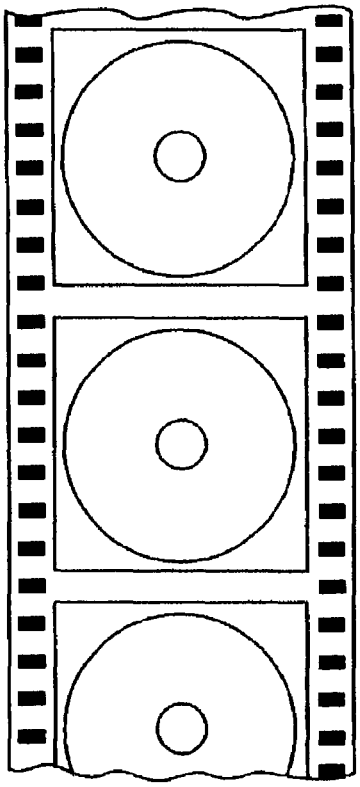
FIG. 4a illustrates photographic film used to capture the annular panoramic image.

In one embodiment of the present invention, the image capture mechanism can be a frame of photographic film as illustrated in FIG. 4a. Using conventional photography techniques, several successive frames can be used to record series of images. The series of images may be several distinct still images taken from different locations. Alternatively, the series of images may be a set of successive images recorded used to create a panoramic motion picture. The image that is recorded onto photographic film is then later converted into a digital image for digital image processing as will be described in later sections of this document.

Figure 4B:
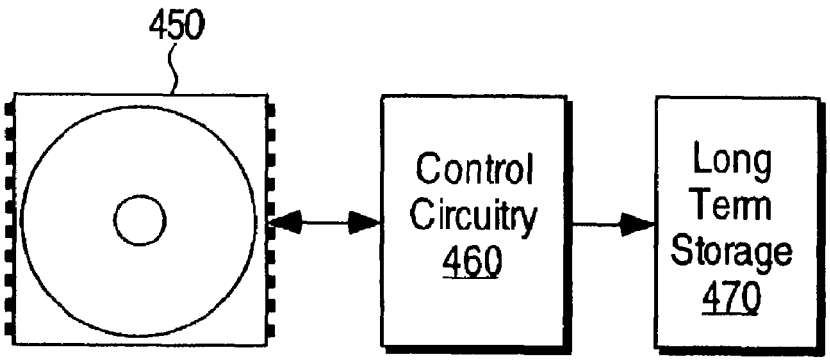
FIG. 4b illustrates a Charged Coupled Device array used to capture the annular panoramic image.

In the preferred embodiment of the present invention, a high resolution digital image capture system is used to capture the annular image created by the optical elements. In one embodiment of the present invention, a Charged Coupled Device (CCD) array 450 is placed in the image plane to capture the image as illustrated in FIG. 4b. Control circuitry 460 coupled to the CCD array 450 captures the image directly into a digital format. The use of a digital image capture system allows an immediate read-out of the digitized raw annular image. The digitized raw annular image can be stored into a storage device 470 such as flash memory or a hard disk drive. The CCD array 450 may be color (RGB) or black & white, depending on the intended application.

To generate an annular image of sufficient quality to be used in the Apple QuickTime® VR market, it has been determined that the image plane must be sampled with an array having at least 2K by 2K elements. To meet this requirement, one embodiment of the present invention uses a CCD array produced by Loral-Fairchild, Inc. However, the high resolution CCD array sold by Loral-Fairchild, Inc., adds a significant cost to the panoramic camera of the present invention. Furthermore, large CCD arrays such as the Loral-Fairchild array have difficulty handling the extreme differences in light intensity that are produced by the optical system of the present invention. Specifically, one area of the image may have direct sunlight and other areas may receive comparatively little light.

To reduce the production cost of the panoramic camera, alternate embodiments of the present invention use a set of lower resolution CCD arrays. Specifically, consumer grade CCD devices that are targeted at the consumer electronics market are used. Consumer electronics grade CCD arrays have the distinct advantages of lower cost, more highly-integrated support circuitry availability, high speed read-out, robustness to extreme lighting and other environmental conditions.

No individual consumer grade CCD array meets the high resolution requirements needed by the present invention (at least 2K by 2K elements). Therefore, a method of obtaining a greater image resolution is required if consumer grade CCDs are used.

Figure 5:
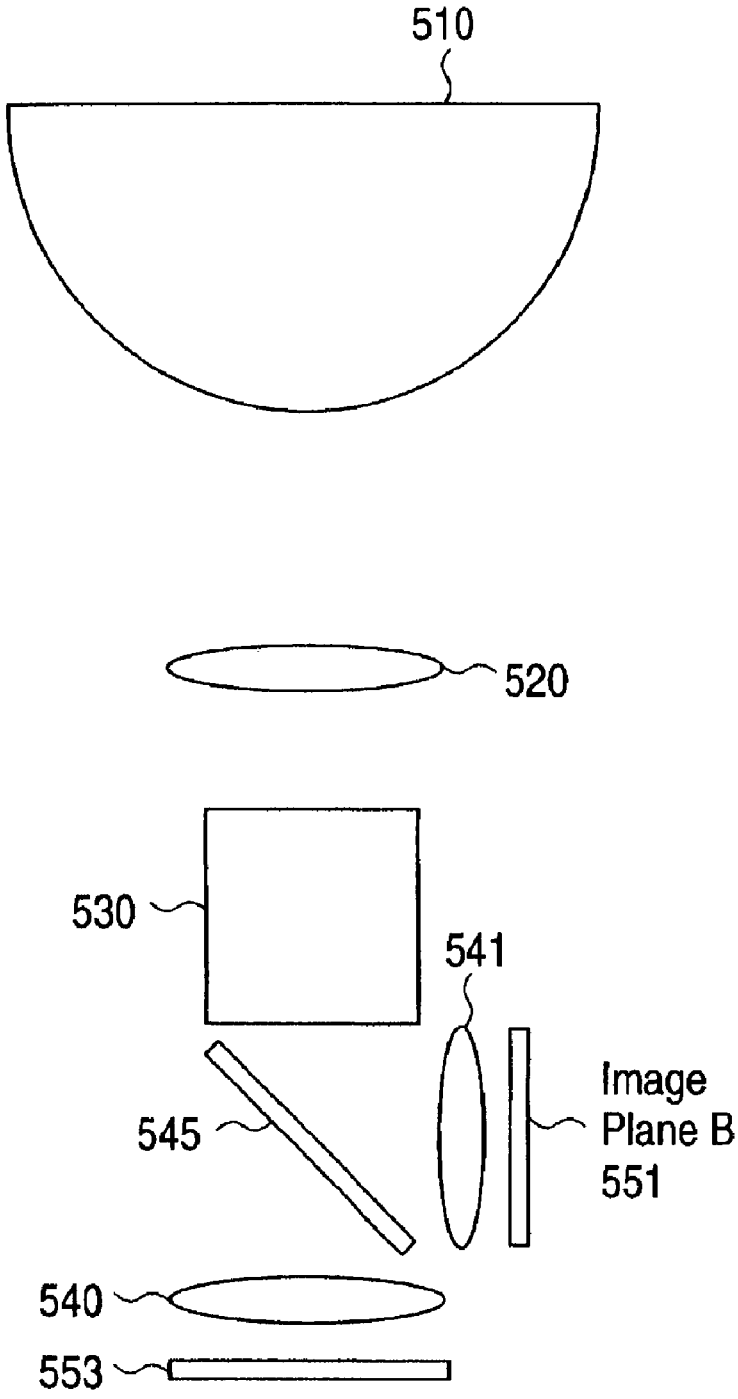
FIG. 5 illustrates an alternate embodiment of the camera system of the present invention wherein a beam splitter is used to allow the annular image to be captured on two image planes.

One method of creating an acceptable image capture mechanism using consumer grade CCD arrays is to use multiple low resolution CCD chips to cover the image plane using a mosaic pattern. Referring to FIG. 5, the basic panoramic camera configuration described in the previous sections is illustrated except the last stage has an added beam-splitter 545 that directs a second image to a second field flattening lens 541 and a second image plane 551. The beam-splitter 545 may comprise a half-silvered mirror or a prism arrangement as is known in the art. The two image planes (image plane 551 and image plane 553) each capture a portion of the whole annular image. To construct a complete image, the camera optically composites the images from the two different image planes into a single image.

Figure 6A:
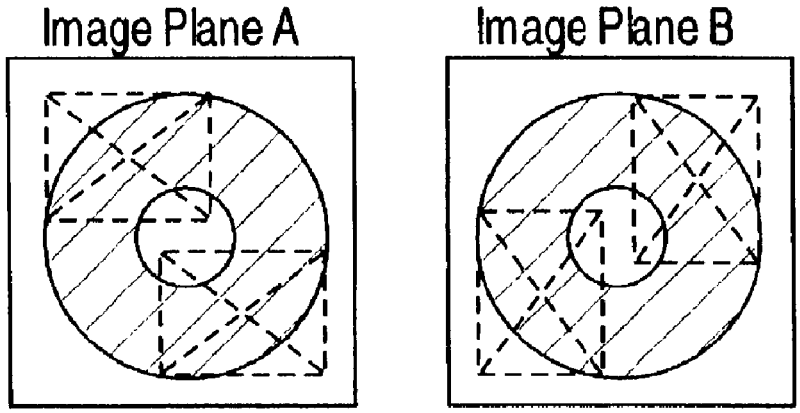
FIG. 6a illustrates a first embodiment of two image planes used to capture different portions of a single annular panoramic image.
Figure 6B:
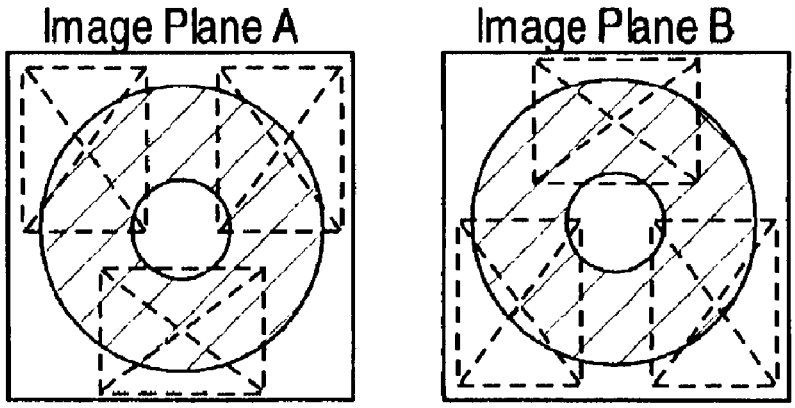
FIG. 6b illustrates a second embodiment of two image planes used to capture different portions of a single annular panoramic image.

FIGS. 6a and 6b each illustrate one possible embodiment of the dual image plane image capture system. FIG. 6a illustrates a mosaic pattern created with four consumer grade CCD devices. As illustrated in FIG. 6a, the two image planes capture the whole annular image while each image plane leaves room for the chip lead frames and support circuitry. FIG. 6b illustrates an alternate embodiment that six consumer grade CCD devices. An additional advantage of this scheme is that the CCD array chips can potentially share some supporting circuitry since the signals each independent chip requires are often identical.

A disadvantage of the mosaic technique is the image capture variation that will exist between the different CCD chips. The image variation can be compensated for by having overlapping CCD array coverage. The overlapping area is used to cross calibrate the image variation between adjacent CCD arrays.

Folded Optics Configuration

Figure 7:
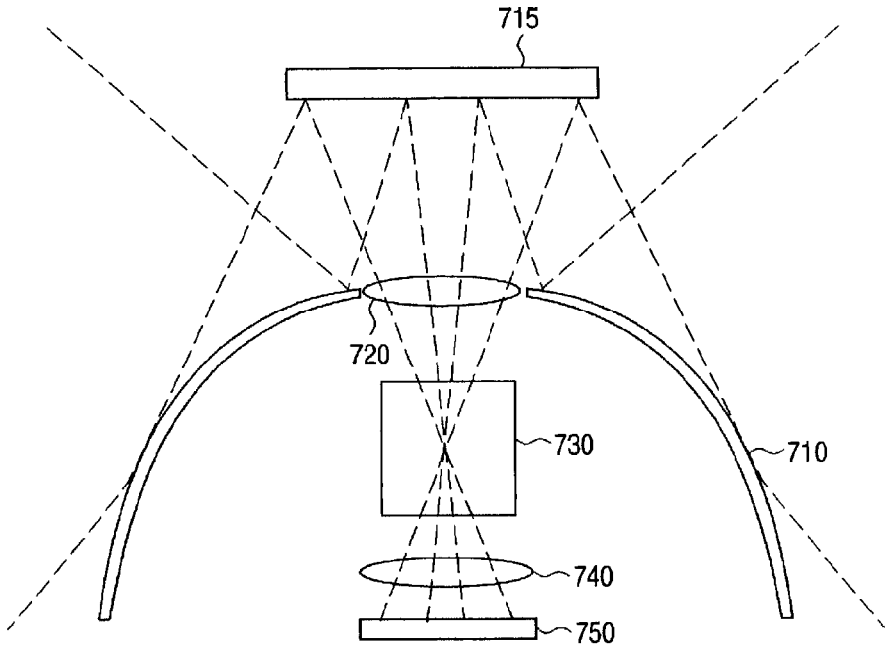
FIG. 7 illustrates an embodiment of the panoramic camera wherein some of the optical elements are housed within the parabolic mirror.

FIG. 7 illustrates an alternative embodiment of the panoramic camera system. In the embodiment of FIG. 7, the camera subassembly is housed within the parabolic mirror. Referring to FIG. 7, the convex mirror 710 is inverted and a hole is cut into the tip. A second mirror 715 is placed above the convex mirror 710, directing the light from the surrounding panorama into the hole in the top of the convex mirror 710. The remainder of the optical path, including the astigmatism correction lens 720, the objective lens 730, the field flattening lens 740, and the image capture mechanism 750, are all housed inside the inverted convex mirror 710. It is apparent from the diagram of FIG. 7 that the "folded optics" configuration protects the optical path and mechanical parts of the panoramic camera system.

Transparent Block Configuration

Figure 8A:
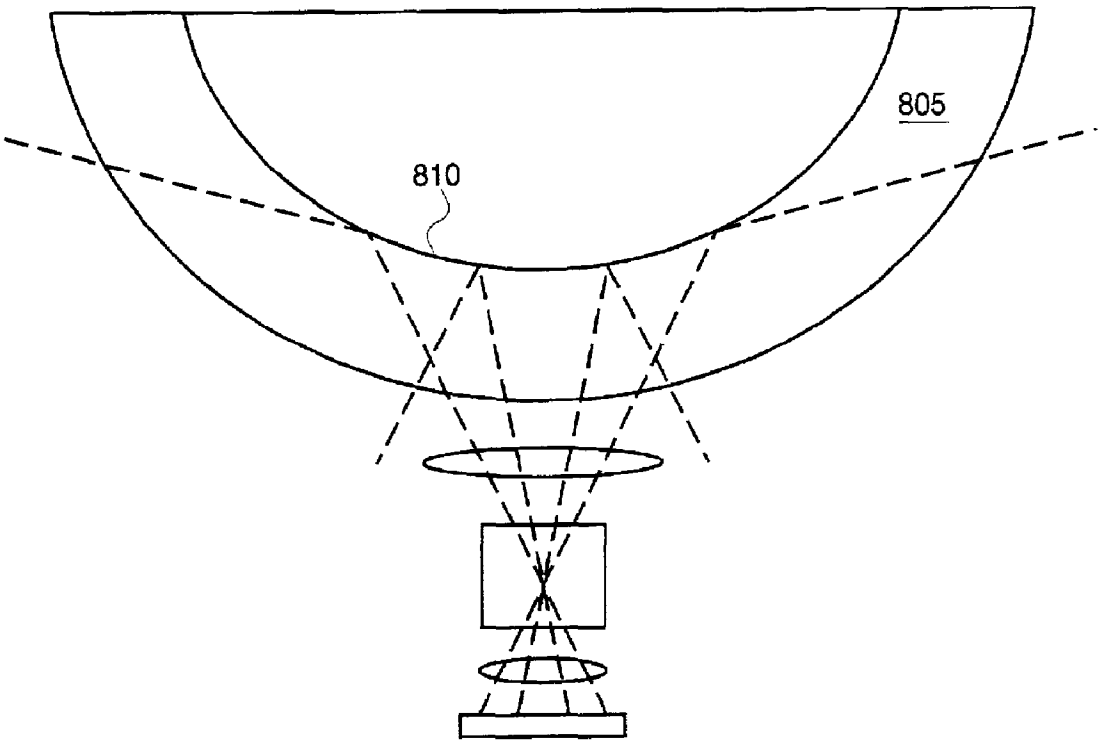
FIG. 8a illustrates a first embodiment of the panoramic camera that uses a solid transparent block to surround the parabolic mirror.

Another alternative embodiment is shown in FIG. 8a. In this alternative, the convex mirror is formed as the internal space of a curved block of transparent material such as glass or plastic. The mirror surface 810 is formed by the inner surface of a hole that is milled or cast in the top of the transparent material 805. The shape of the outer surface approximates a sphere centered on the virtual focal point of the convex mirror 810. The outer surface of the transparent material is a polished surface that forms the outside skin of the camera. The bottom tip of the transparent block is optically mated to the other optical parts of the camera system. The bottom tip may be polished flat or molded into a shape that contributes to the astigmatism lens group.

The solid transparent block approach has a number of significant advantages. First, the mirrored inner surface of the transparent block material can be well protected. This technique overcomes the disadvantages of front surface mirrors. Specifically, when front surface mirrors are exposed to the outside world they are susceptible to damage and degradation. In the above described embodiment, the mirrored surface is fully protected since it is encased between a protective backing material and the transparent block material. Another advantage of the solid block approach is that the skin of the camera is incorporated into the optical system. Thus only one surface would need to be multicoated to prevent internal reflections.

Figure 8B:
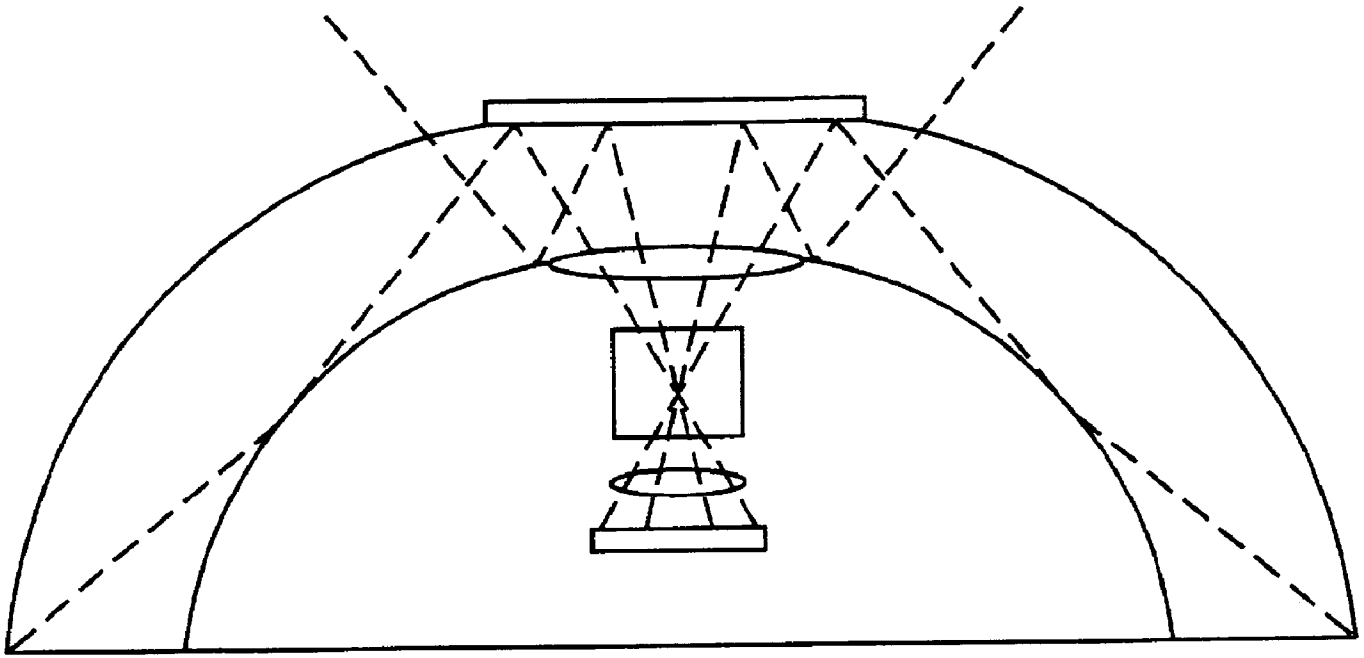
FIG. 8b illustrates a second embodiment that uses a solid transparent block to surround the parabolic mirror which houses other optical elements.

The transparent block technique can also be implemented using the folded optics scheme described in the previous section. Specifically, FIG. 8b illustrates an inverted solid transparent block used to implement a panoramic camera system. In this case, the camera components are contained within the mirror cavity. Note that the outside surface at the top of the block is no longer an exit path but is instead a mirrored surface that directs the image light down into an optical path inside the parabolic block.

Different methods can be used to construct a transparent block panoramic camera system. One method would be to create the transparent block, then polish the transparent block, and finally add a mirrored surface where appropriate. An alternate method of constructing a transparent block panoramic camera system would start with the convex mirror. Then, the convex mirror would be encapsulated within the transparent block. This method would be simpler to construct since a concave surface would not require polishing. Furthermore, the convex mirror would be protected by the transparent block.

Center Support Configuration

Figure 9A:
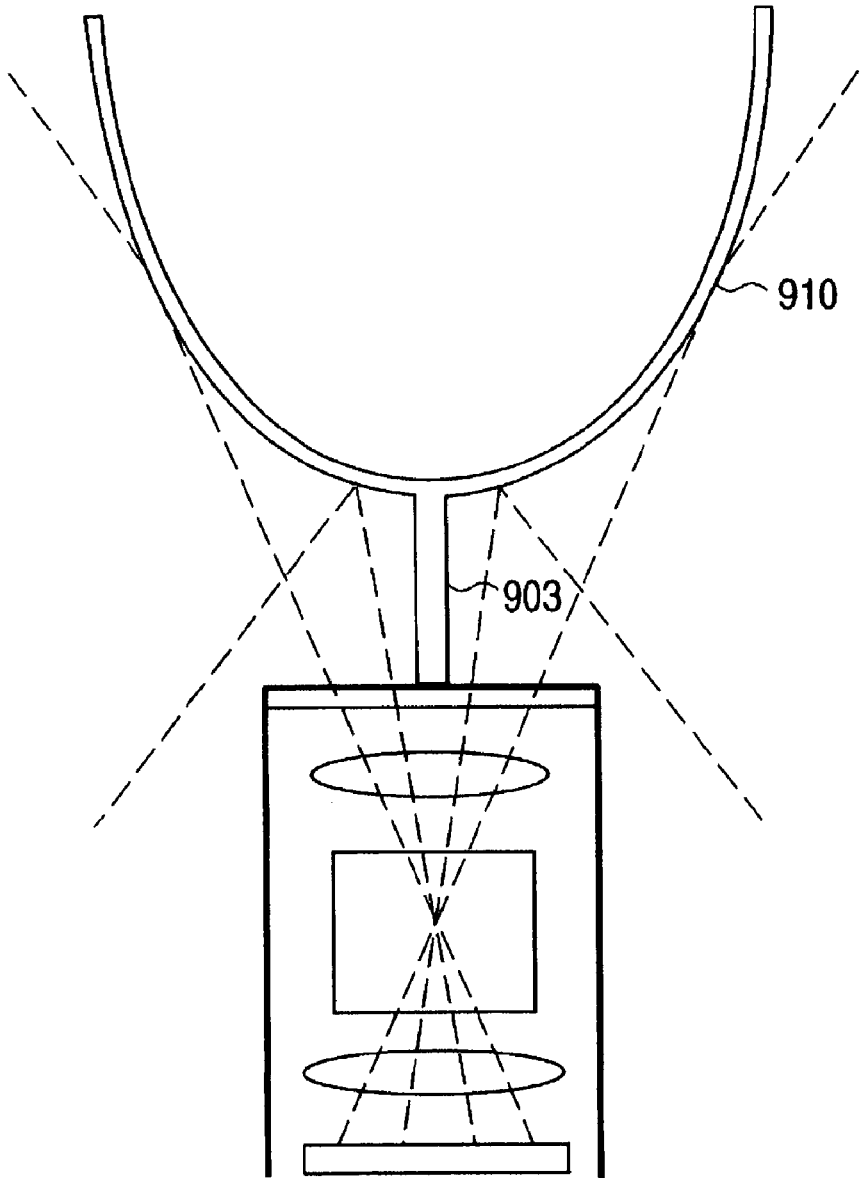
FIG. 9a illustrates an embodiment that panoramic camera that supports the convex mirror with a central post that is out of the annular field of view.

Another alternative embodiment addresses the problem of how to align and support the optical elements of the panoramic camera illustrated in FIG. 2a. It is possible to use the protective, transparent block technique as described in the previous section to provide structure, stability and alignment. However, the transparent block technique requires multicoating of the surfaces or else undesired internal reflections will be visible. FIG. 9a discloses an alternate embodiment wherein a central post 903 is used to support the parabolic mirror 910. The remainder of the optical system is below the parabolic mirror 910 and the central post 903. The center support scheme takes advantage of the fact that the center of the annular image is discarded since it contains only an image of the camera itself. Therefore, the center portion of the annular image can be used for support of the parabolic mirror 910.

External Support Configuration

Figure 9B:
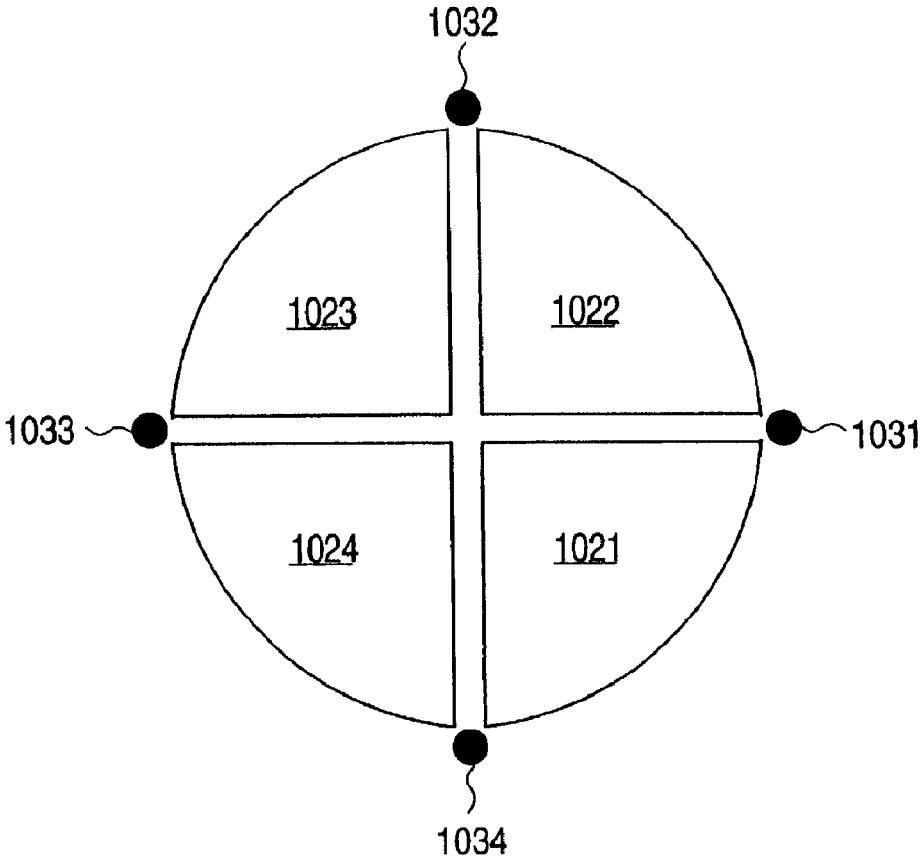
FIG. 9b illustrates an embodiment that panoramic camera that divides the convex mirror in quarters and supports the mirror using posts between the four quarters.

Another scheme for supporting the parabolic mirror above the optical elements below is to use several side supports. This can be accomplished by splitting the parabolic mirror into "pie-pieces" by cutting the parabolic mirror after fabrication. For example, the parabolic mirror can be quartered as illustrated in FIG. 9b. The four sections of parabolic mirror 1021, 1022, 1023, and 1024 can be spread apart slightly, allowing for the introduction of supporting elements 1031, 1032, 1033, and 1034 that will not obstruct the fields of view.

If the parabolic mirror is split into four sections, then the annular image will appear as four quadrants at the image plane. To correct for this, the gaps can be removed during the polar-to-rectangular coordinate conversion, thereby restoring the continuity of the panoramic image. The gaps between the mirror sections should be kept as small as possible, however, since the optical system is degraded by the loss of rotational symmetry.

Panoramic Image Presentation

As illustrated in FIG. 3a, the panoramic camera system of the present invention records a two dimensional annular representation of the surrounding panorama. However, the annular representation is not of much interest to most viewers. Therefore, to display the panoramic images captured by the panoramic camera of the present invention, several different display systems are disclosed.

Still Image Presentation as a Rectangular Panoramic Image

Figure 3B:
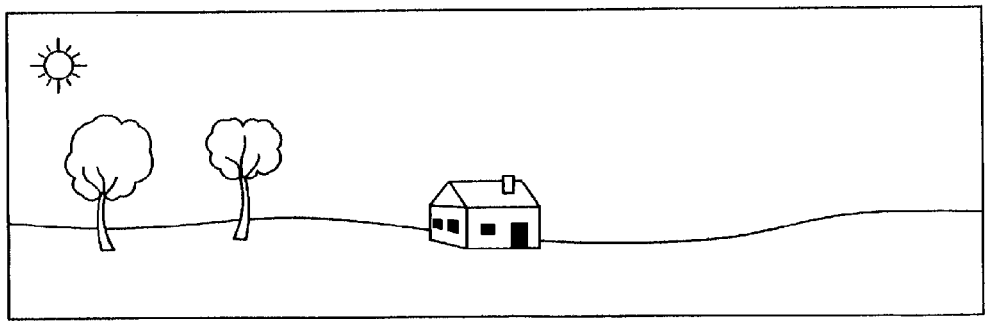
FIG. 3b illustrates a rectangular panoramic image after the captured annular image is transformed from polar coordinates to rectangular coordinates.

The most common method of displaying a panoramic image is to display the image as a rectangle where the horizontal direction represents the view angle. An example of this type of panoramic image presentation is illustrated in FIG. 3b. Such rectangular panoramic images are commonly displayed in nature magazines. As stated in the background, the prior art method of creating such rectangular panoramic images was to take several conventional photographs at different angles and then stitch those photographs together somehow.

With the panoramic camera system of the present invention, such rectangular panoramic images can easily be created. First, the panoramic camera system of the present invention is used to capture an annular image of the surrounding panorama. Then the annular image is digitized and loaded into a computer system. (The image will already be in digital form if a CCD version of the panoramic camera system was used to capture the image.)

Figure 10:
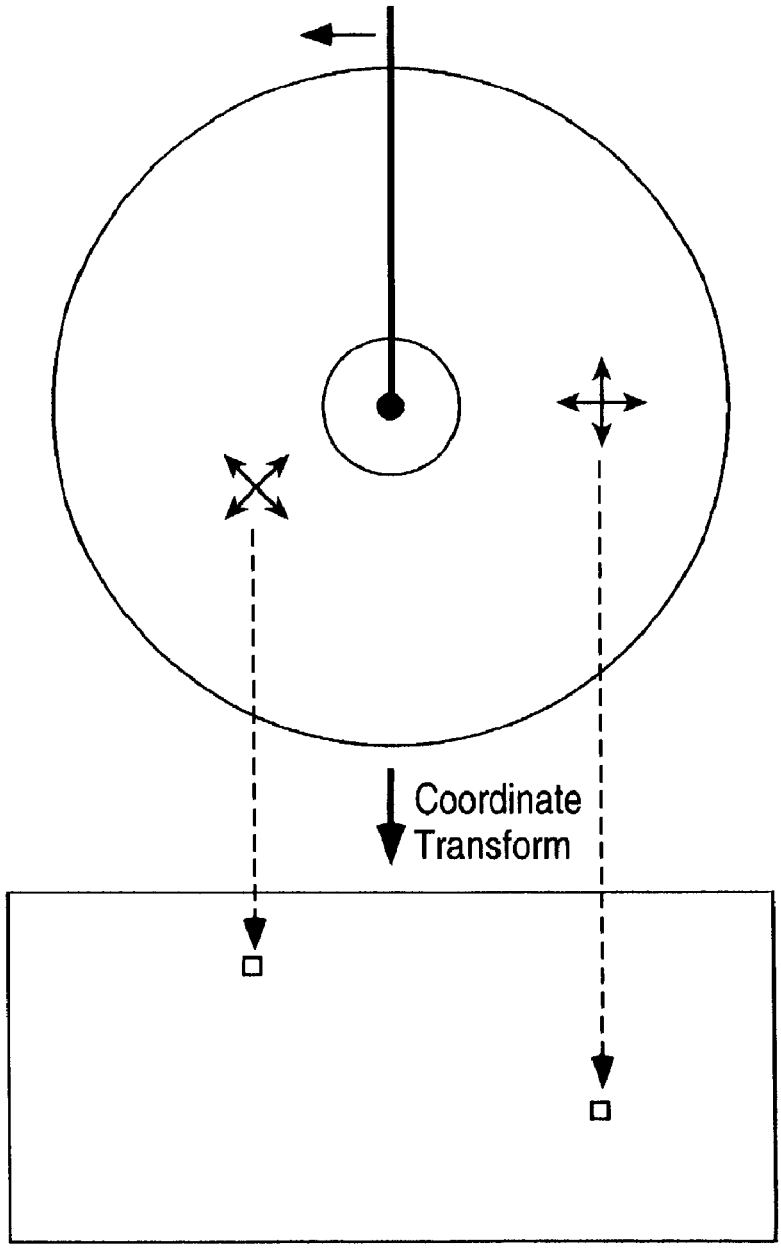
FIG. 10 graphically illustrates how the annular image is sampled to product a rectangular panoramic image.

A custom conversion program is then executed on the computer system. The custom conversion program scans around the annular image starting at an arbitrarily chosen sampling line 310. Points along the sampling line 310 are sampled and then their position changed using polar coordinate to rectangular coordinate conversion. FIG. 10 illustrates how two different points on the annular image are sampled and then placed into rectangular coordinates. As illustrated in FIG. 10, the orientation of the sampling pattern changes as the coordinate transform program rotates around the annular image. The resulting rectangular image is illustrated in FIG. 3b.

While sampling the annular image, it is important to sample the image differently depending on where the annular image is being sampled. The following three rules must be observed:

1. The sampling shape is dynamically changing depending on the viewing angle (both in the horizontal and vertical).
2. The sampling shape size is proportional to the radius (vertical viewing angle); and
3. The sampling shape orientation is different depending on the horizontal viewing angle.

Since there is a greater resolution around the outer perimeter of the annular image, the corresponding rectangular image portion will have better image clarity. The outer perimeter of the annular image may be the top or the bottom of the rectangular image depending on the optical path. (Compare FIG. 2a with FIG. 7). In FIG. 10, the lower portion of the rectangular image will have a better image clarity since it is from the outer perimeter of the annular image. One embodiment of the present invention takes advantage of this fact by using the outer perimeter of the annular image for the ground since the ground in a panoramic scene is generally more detailed than the sky.

Once the panoramic image has been converted from an annular image to a rectangular image on a computer system, then the rectangular image can be presented to viewers in a number of different formats. For example, the rectangular image may be distributed electronically as a JPEG image and viewed with JPEG image viewers. Alternatively, the rectangular image can be printed out with a color printer. It should be noted that since the rectangular image is in digital form, it can quickly be added to a publication being created with a Desktop Publishing Layout Program such QuarkXpress or Adobe's PageMaker.

IMAGE Presentation as a Virtual Reality Image

Apple Computer introduced a standard known as QuickTime® VR for storing and displaying virtual reality images. Apple Computer's QuickTime® VR standard governs the data storage format and the playback software needed to view the QuickTime® VR datasets. The camera system of the present invention can be used to quickly create QuickTime® VR datasets.

Figure 11A:
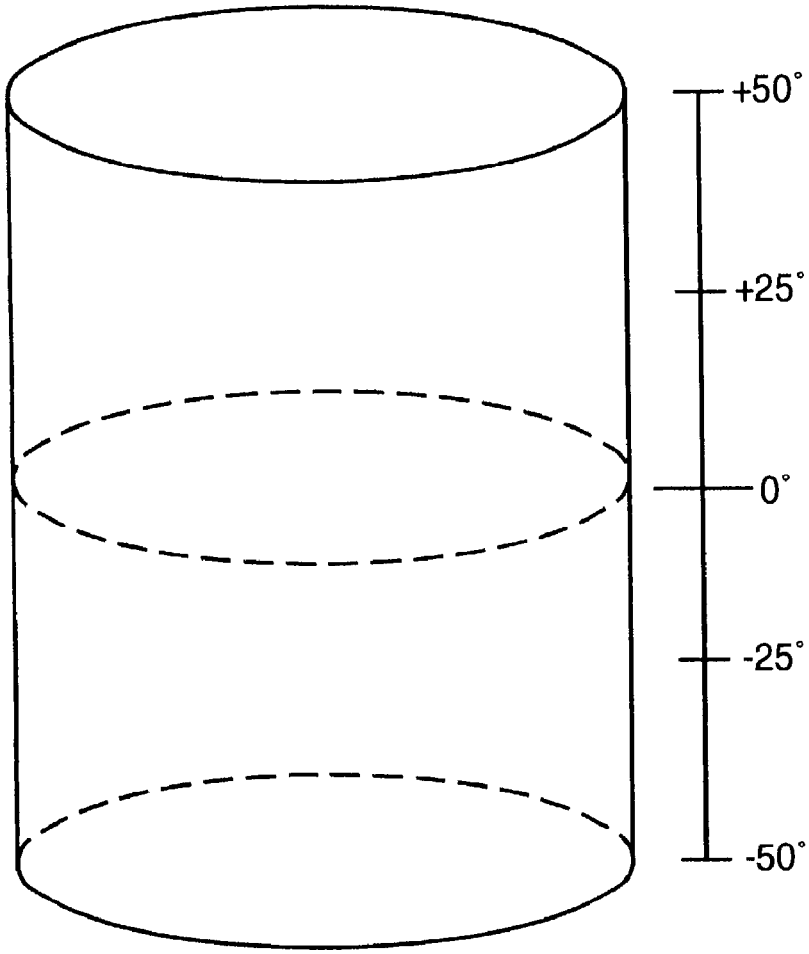
FIG. 11a graphically illustrates how an image is stored in Apple® Computer's QuickTime® VR format.
Figure 11B:
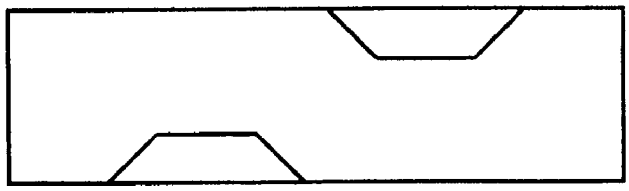
FIG. 11b graphically illustrates how viewports are created from Apple® Computer's QuickTime® VR format.

The QuickTime® VR format stores the image as cylindrical image as illustrated in FIG. 11a. Specifically, the viewpoint is at the center of the cylinder and the inner surface of the cylinder represents the stored QuickTime® VR image. Note that trapezoid shaped patches must be sampled to generate an image if the user is looking up or down as illustrated in FIG. 11b.

Figure 11C:
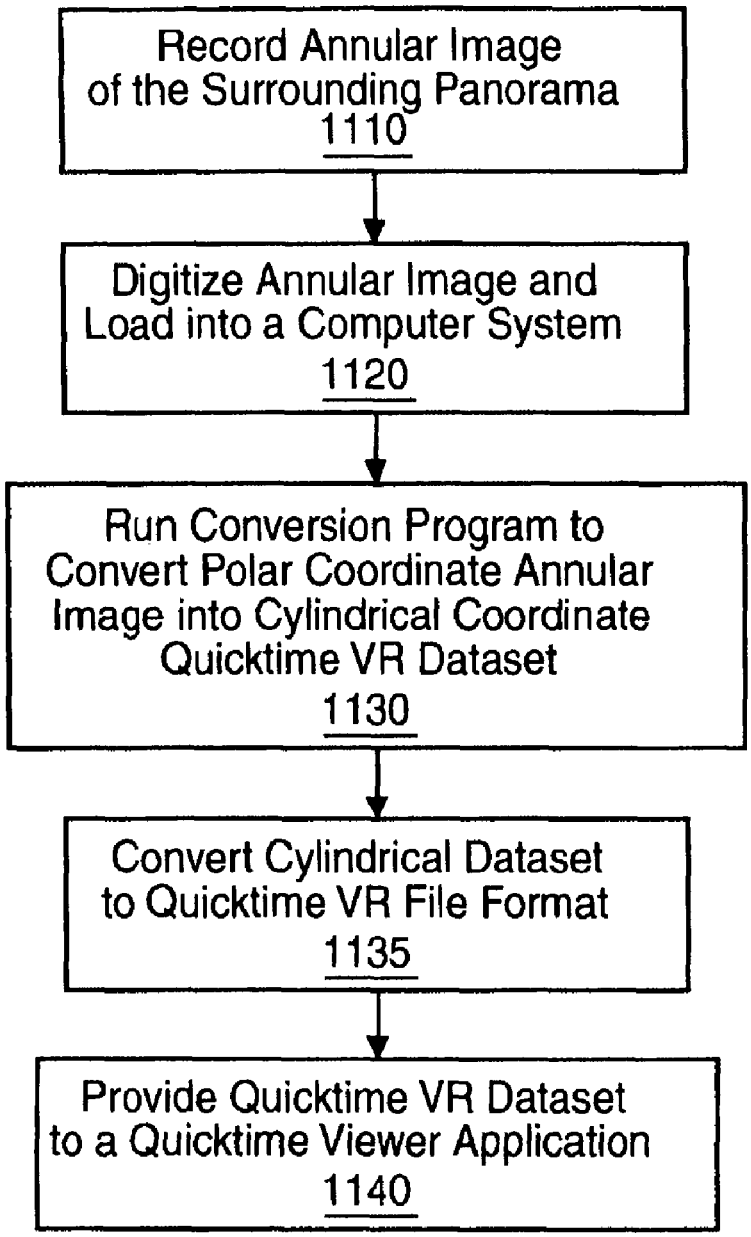
FIG. 11c illustrates a flow chart that lists how the panoramic camera system can be used to create images in Apple® Computer's QuickTime® VR format.

FIG. 11c illustrates a flow diagram that lists the steps required to produce a QuickTime® VR dataset using the panoramic camera system of the present invention. First, at step 1110, a panoramic image is recorded with the panoramic camera. Then, at step 1120, the recorded image is digitized and loaded into a computer system. If the panoramic camera recorded the image on a piece of film, then a print of the film can be scanned into the computer system using a flatbed scanner. Alternatively, a film image can be commercially transformed into the well known PhotoCD® format produced by Kodak®. If the panoramic camera recorded the image with a CCD array and stored the image digitally, then the digital image is just copied from the camera's storage system into the computer system's storage system.

After the digital version of the annular image is available on the computer system, a transformation program is then executed on the computer system at step 1130 in order to transform the digitized annular image into a QuickTime® VR dataset. The annular image produced by the camera system of the present invention stores the panoramic image information in a polar coordinate system. Conversely, Apple®'s QuickTime® VR uses a cylindrical coordinate system as illustrated in FIG. 11a. Thus, the transformation program converts the annular image from its polar coordinate system into the QuickTime® VR cylindrical coordinate system. After transforming the image into the QuickTime® VR cylindrical coordinate system, then a file is created using the QuickTime® VR file format at step 1135.

Once the coordinate transform is complete, the transformed image can be viewed using Apple's QTVR player program as stated in step 1140.

Still Image Presentation on a Computer Network

Since the present invention can store the annular image in digital form, a very useful method of distributing panoramic images is through a computer network. In particular, the hypertext transport protocol (http) of the World Wide Web (WWW) on the Internet can be used to distribute still annular images. The still annular images would be stored on a World Wide Web server. To access the still annular images, any user coupled to the Internet would use a World Wide Web browser program.

One method of transporting the images would be to define a new panoramic image annular data format. The images could then be downloaded as stored in the panoramic image annular data format. A helper application would then display the images once downloaded.

Figure 12:
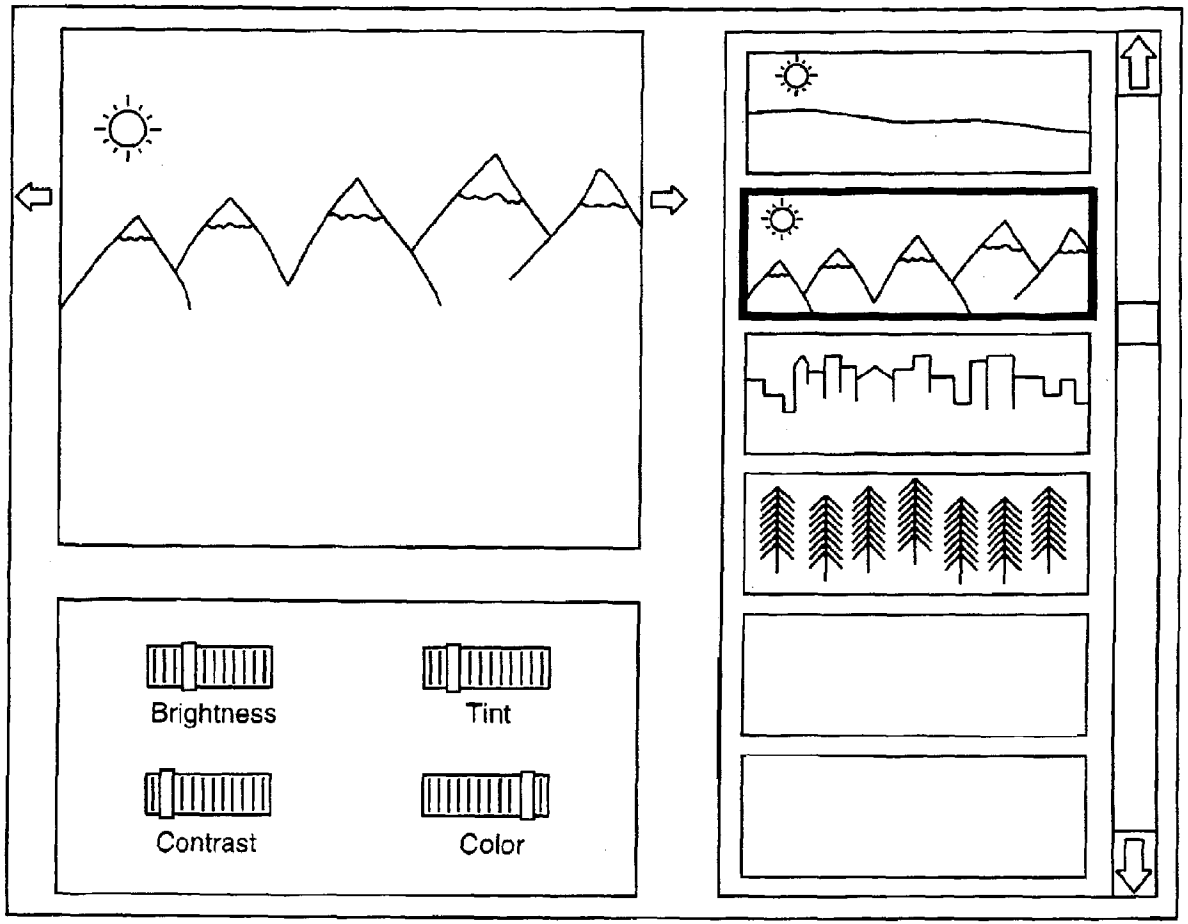
FIG. 12 illustrates a graphical user interface for a client program used to view panoramic still images created by the panoramic camera system.

A better method of displaying images using the hypertext transport protocol (http) of the World Wide Web (WWW) would be to implement a "plug-in" application that would work with the browser program. FIG. 12 illustrates a graphical user interface for one possible client panoramic image presentations system. On the right side of FIG. 12, a set of different panoramic images to display is available. To display one of those images, the user selects the image with a cursor control device. On the upper left of the graphical user interface of FIG. 12 is viewport for displaying a portion of a panoramic image. Pan arrows on either side of the viewport allow the user to pan left and right.

Image Presentation as Video

Figure 13A:
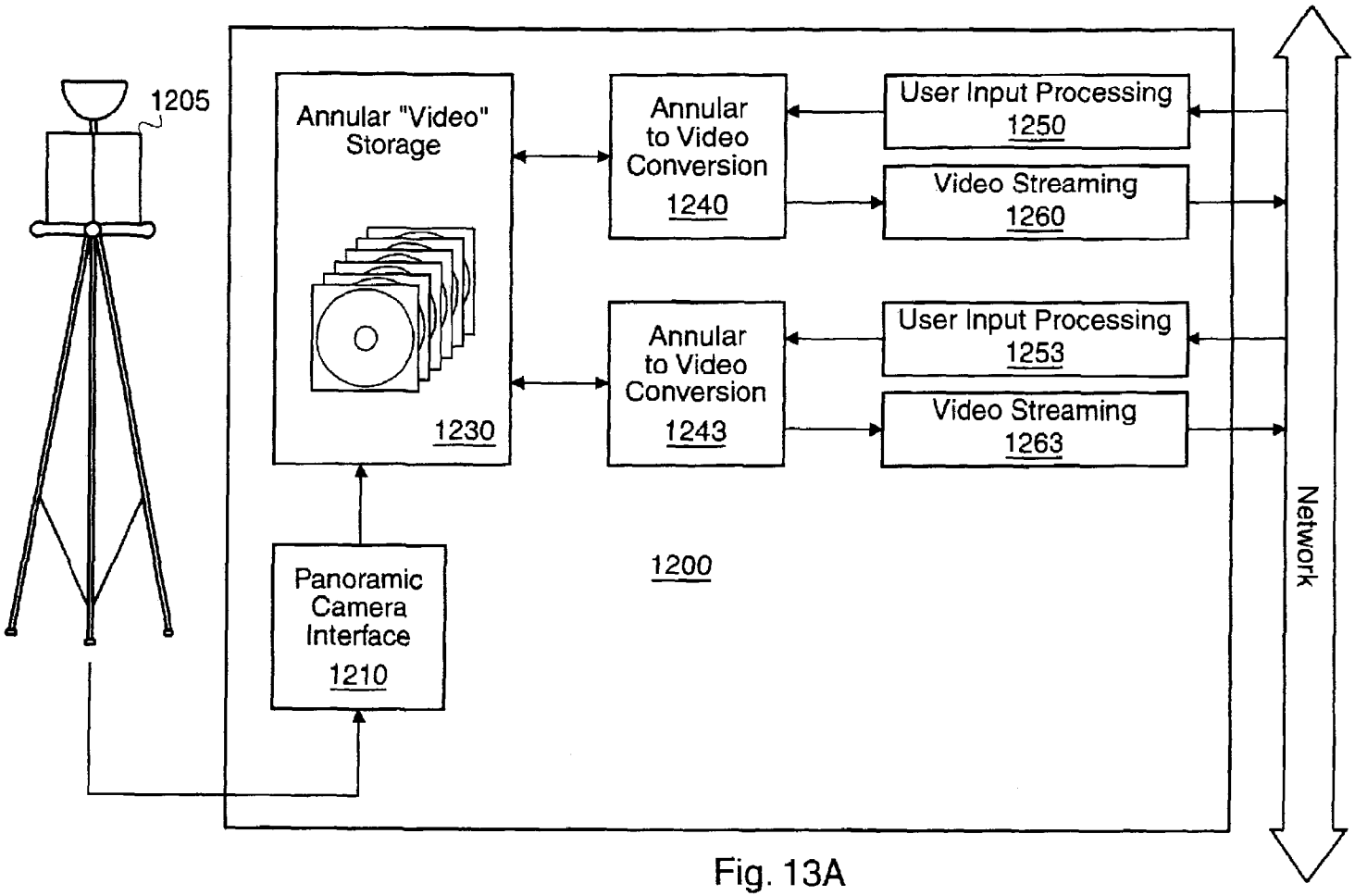
FIG. 13a illustrates a graphical user interface for a client program used to view panoramic video created by the panoramic camera system.
Figure 13B:
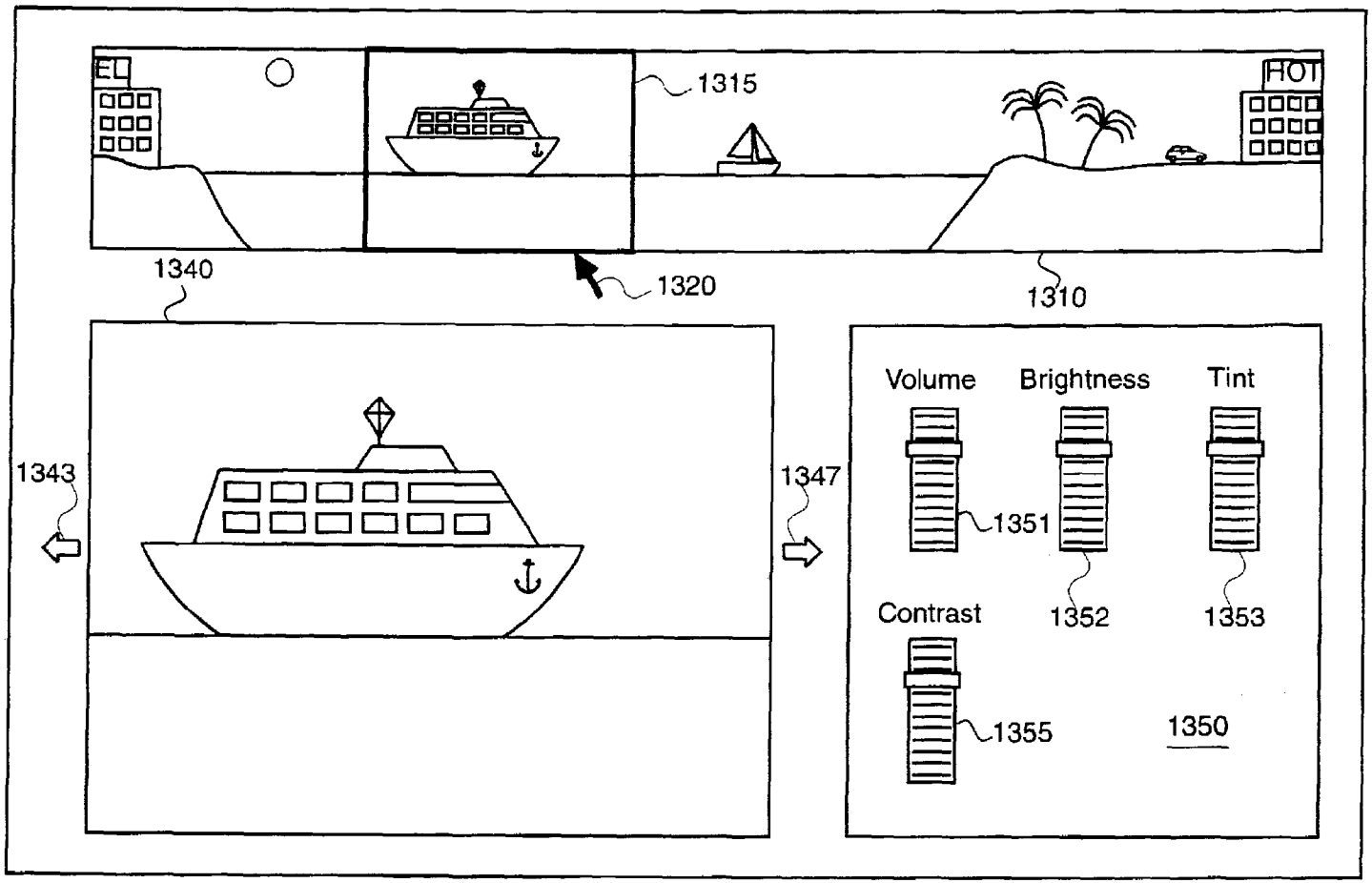
FIG. 13b illustrates a networked computer arrangement used to view panoramic video created by the panoramic camera system.

One of the most interesting presentation systems for the present invention is a video presentation system. FIGS. 13a and 13b illustrate one possible video presentation system.

Referring to FIG. 13a, a CCD version of the panoramic camera system 1205 of the present invention is illustrated coupled to a computer system 1200. The CCD version of the panoramic camera system 1205 is coupled through a panoramic camera interface 1210. The panoramic camera interface 1210 receives a digital stream of annular images. To interface with computer systems, one embodiment of the panoramic camera interface 1210 is the FireWire system that is described in the IEEE 1394 standard.

After being received through the panoramic camera interface 1210, the digitized annular images are stored in an Annular "Video" Storage system 1230. The Annular "Video" comprises a series of a consecutive annular images taken with a CCD version of the panoramic camera system 1205.

To display the Annular Video as normal video, the annular frames must be converted from the annular image format into normal video images. In one embodiment of the present invention, only a portion of the annular image is converted into normal video. One reason for this is that the aspect ratio of video does not allow for good viewing of wide but short rectangular panoramic images. Furthermore, by only transforming a portion of the annular image into normal video, the transformation can be done in real-time without requiring exceedingly fast computer equipment. The transformation of annular video to normal video is done by annular to video conversion units 1240 and 1243.

To display the normal video, existing video streaming software 1260 and 1263 can be used. For example, using a standard transmission protocol like MPEG or proprietary protocols such as StreamWorks produced by Xing Technology Corporation of Arroyo Grande, Calif., or VDOLive produced by VDOnet Corporation of Santa Clara, Calif., the video can be provided to computer users coupled to a network. One skilled in the art will understand that one way to transmit information (for example, still or video digital data; or plug-ins or other computer software) is by embodying the data in a carrier wave that is transmitted over the network.

FIG. 13b illustrates one possible embodiment of a graphical user interface (GUI) for accessing the annular video. In the GUI of FIG. 13b, a video viewport 1340 is used to display the video. A smaller still panoramic image 1310 is used to illustrate a static version of the full panoramic video. A locator window 1315 is used to identify the view angle that the video window 1340 is displaying within the full panoramic view that is available.

To change the view angle, the user can select a pan right arrow 1347 or a pan left arrow 1343 with a cursor 1320. Alternatively, the user can simply move the position of the locator window 1315 within the still panoramic image 1310. In the embodiment of FIG. 13b, the entire vertical image aspect of the image is compressed into the video viewport 1340.

Referring back to FIG. 13a, user input processing routines 1250 and 1253 processing the user's commands. When the user requests a viewpoint change, the new viewpoint is communicated to the respective annular to video conversion units 1240 or 1243 such that it will begin converting images from the new user viewpoint. In an alternate embodiment, the user input processing routines are placed within the client program on the client computer system. For example, in an embodiment of a WWW browser program, a plug-in program can process the user commands and simply pass the location of the video viewport to the server.

Referring back to FIG. 13b, a parameter window 1350 is also available to the viewer. The parameter window 1350 allows the user to adjust some of the viewing parameters such as Image Brightness 1352, Image Tint 1353 and Image Contrast 1355. When a user adjusts these parameters, the changes will be processed by the user input processing routines 1250 and 1253 provided to the annular to video conversion units 1240 or 1243 or the video streaming software 1260 or 1263 such that video quality is changed.

Telepresence: Video and Audio

Figure 14A:
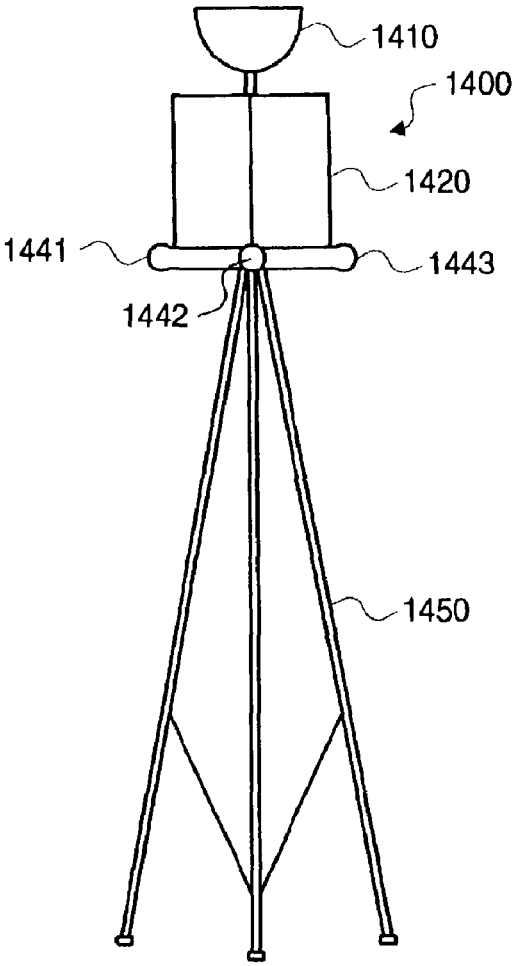
FIG. 14a illustrates a side view of one embodiment of the panoramic camera system that includes microphones.
Figure 14B:
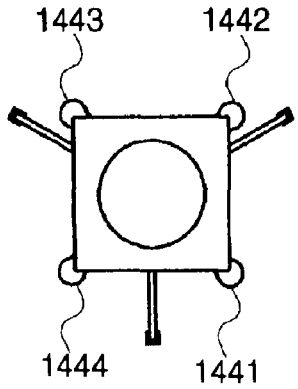
FIG. 14b illustrates a side view of one embodiment of the panoramic camera system that includes microphones.

To more completely convey the experience of being at a different location, the present invention can be combined with a three-dimensional sound system. Referring to FIGS. 14a and 14b, an embodiment of the camera system is illustrated with four directional microphones 1441, 1442, 1443, and 1444. The four directional microphones 1441, 1442, 1443, and 1444 capture sound emanating from four cardinal directions.

To add three dimensional sound, the sound from the various directional microphones is mixed depending on the viewing angle that a user has selected. For example, if a viewer that is seeing a real-time image from camera 1400 of FIG. 14a is viewing straight out of the page, then the left speaker will receive information from microphone 1443 and the right speaker will receive information from microphone 1441. The sound can be provided to users on a computer network using audio streaming software such as RealAudio by Progressive Networks, Inc. As the viewer adjusts the viewing angle, the sound from the directional microphones will be adjusted accordingly.

By adding sound to the system, the user is provided with cues as to which direction they should be viewing. For example, if the user hears a sound from "behind", then the user can change the view angle to look backward.

The foregoing has described a camera device that captures 360 degree panoramic images and presentation systems for displaying such images. It is contemplated that changes and modifications may be made by one of ordinary skill in the art, to the materials and arrangements of elements of the present invention without departing from the scope of the invention.

We claim:

1. A method of presenting panoramic images, [said] *the* method comprising [the steps of]:

recording an annular representation of a panorama *via an image capture system*;

storing [said], *at a storage device, the* annular representation of [said] *the* panorama as a digitized annular representation;

geometrically transforming [said], *via a computer system, the* digitized annular representation of [said] *the* panorama into a rectangular projection of [said] *the* panorama; [and]

[displaying said rectangular projection of said panorama,]

wherein [said] *the* step of geometrically transforming further comprises sampling [said] *the* digitized annular representation with a dynamically changing sampling shape, *and* wherein [said] *the* sampling shape is dependent upon a viewing angle.

2. A method of presenting panoramic images, [said] *the* method comprising [the steps of]:

recording an annular representation of a panorama *via an image capture system*;

storing [said], *at a storage device, the* annular representation of [said] *the* panorama as a digitized annular representation;

geometrically transforming [said], *via a computer system, the* digitized annular representation of [said] *the* panorama into a rectangular projection of [said] *the* panorama; and

[displaying said rectangular projection of said panorama,]

wherein [said] *the* step of geometrically transforming further comprises sampling [said] *the* digitized annular representation with a dynamically changing sampling shape orientation, *and* wherein [said] *the* sampling shape orientation is dependent upon a horizontal viewing angle.

3. A method of presenting panoramic images, [said] *the* method comprising [the steps of]:

recording an annular representation of a panorama *via an image capture system*;

storing [said], *at a storage device, the* annular representation of [said] *the* panorama as a digitized annular representation; *and* geometrically transforming [said], *via a computer system, the* digitized annular representation of [said] *the* panorama into a cylindrical representation of [said] *the* panorama[; and displaying said cylindrical representation of said panorama using a computer program].

4. The method [as claimed in] *of* claim 3 [wherein said step of], *further comprising* displaying [said] *the* cylindrical representation of [said] *the* panorama [using a computer program comprises running a QuickTime VR program].

*5. The method of claim 4, wherein the step of displaying the cylindrical representation of the panorama comprises displaying the cylindrical representation of the panorama using a computer program running QuickTime VR program.*

*6. The method of claim 3, wherein the step of geometrically transforming comprises sampling the digitized annular representation with a dynamically changing sampling shape orientation.*

*7. The method of claim 6, wherein the sampling share orientation is dependent upon a horizontal viewing angle.*

*8. The method of claim 6, wherein the sampling shape is proportional to a vertical viewing angle.*

*9. The method of claim 3, wherein the step of storing comprises storing the annular representation in a polar coordinate system.*

*10. The method of claim 9, further comprising converting the annular representation from the polar coordinate system to a cylindrical coordinate system.*

*11. The method of claim 1, further comprising displaying the rectangular projection of the panorama.*

*12. The method of claim 1, wherein the sampling shape is proportional to at least one of a vertical viewing angle and a horizontal viewing angle.*

*13. The method of claim 12, wherein the sample shape is dependent on both the vertical and horizontal viewing angles.*

*14. The method of claim 2, further comprising displaying the rectangular projection of the panorama.*

*15. The method of claim 2, wherein the sampling shape is proportional to a vertical viewing angle.*

*16. An apparatus comprising:*

*an image capture system configured to record an annular representation of a panorama;*

*a storage device configured to store the annular representation of the panorama as a digitized annular representation; and*

*a computer system configured to geometrically transform the digitized annular representation of the panorama into a rectangular projection of the panorama by, at least in part, sampling the digitized annular representation with a dynamically changing sampling shape, wherein the sampling shape is dependent upon a viewing angle.*

*17. The apparatus of claim 16, further comprising a display configured to display the rectangular projection of the panorama.*

*18. The apparatus of claim 16, wherein the sampling shape is proportional to at least one of a vertical viewing angle and a horizontal viewing angle.*

*19. The apparatus of claim 16, wherein the sample shape is dependent on both the vertical and horizontal viewing angles.*

*20. The apparatus of claim 16, further comprising:*

*a convex mirror configured to collect light from a 360 degree scene;*

*an astigmatism correction lens configured to focus the collected light from the convex mirror;*

*an objective lens configured to form an image using the focused light from the astigmatism correction lens; and*

*a field flattening lens configured to flatten a field of optimum focus of the focused light from the objective lens into a two-dimensional image.*

*21. The apparatus of claim 16, wherein the image capture system comprises a charge coupled device array configured to capture the annular representation of the panorama.*

*22. The apparatus of claim 21, wherein the charge coupled device array comprises a plurality of charge coupled device chips arranged across an image plane in a mosaic pattern.*

*23. An apparatus comprising:*

*an image capture system configured to record an annular representation of a panorama;*

*a storage device configured to store the annular representation of the panorama as a digitized annular representation; and*

*a computer system configured to geometrically transform the digitized annular representation of the panorama into a rectangular projection of the panorama by, at least in part, sampling the digitized annular representation with a dynamically changing sampling shape orientation, wherein the sampling shape orientation is dependent upon a horizontal viewing angle.*

*24. The apparatus of claim 23, further comprising a display configured to display the rectangular projection of the panorama.*

*25. The apparatus of claim 23, wherein the sampling shape is proportional to a vertical viewing angle.*

*26. The apparatus of claim 23, further comprising:*

*a convex mirror configured to collect light from a 360 degree scene;*

*an astigmatism correction lens configured to focus the collected light from the convex mirror;*

*an objective lens configured to form an image using the focused light from the astigmatism correction lens; and*

*a field flattening lens configured to flatten a field of optimum focus of the focused light from the objective lens into a two-dimensional image.*

*27. The apparatus of claim 23, wherein the image capture system comprises a charge coupled device array configured to capture the annular representation of the panorama.*

*28. The apparatus of claim 27, wherein the charge coupled device array comprises a plurality of charge coupled device chips arranged across an image plane in a mosaic pattern.*

*29. An apparatus comprising:*

*an image capture system configured to record an annular representation of panorama;*

*a storage device configured to store the annular representation of the panorama as a digitized annular representation; and*

*a computer system configured to geometrically transform the digitized annular representation of the panorama into a cylindrical representation of the panorama.*

*30. The apparatus of claim 29, further comprising a display configured to display the cylindrical representation of the panorama.*

*31. The apparatus of claim 30, wherein the display is configured to display the cylindrical representation of the panorama in accordance with instructions from a computer program running a QuickTime VR program.*

*32. The apparatus of claim 29, wherein the computer system is further configured to sample the digitized annular representation with a dynamically changing sampling shape orientation.*

*33. The apparatus of claim 32, wherein the sampling shape orientation is dependent upon at least one of a horizontal viewing angle and a vertical viewing angle.*

*34. The apparatus of claim 29, wherein the storage device is configured to store the annular representation in a polar coordinate system.*

*35. The apparatus of claim 34, wherein the computer system is further configured to convert the annular representation from the polar coordinate system to a cylindrical coordinate system.*

*36. A non-transitory computer-readable medium having instructions stored thereon for causing a computing device to perform operations comprising:*

*recording an annular representation of a panorama;*

*storing the annular representation of the panorama as a digitized annular representation; and*

*geometrically transforming the digitized annular representation of the panorama into a rectangular projection of the panorama by, at least in part, sampling the digitized annular representation with a dynamically changing sampling shape, wherein the sampling shape is dependent upon a viewing angle.*

*37. The non-transitory computer-readable medium of claim 36, wherein the instructions further cause the computing device to perform operations comprising displaying the rectangular projection of the panorama.*

*38. The non-transitory computer-readable medium of claim 36, wherein the sampling shape is proportional to at least one of a vertical viewing angle and a horizontal viewing angle.*

*39. The non-transitory computer-readable medium of claim 38, wherein the sampling shape is dependent on both the vertical and horizontal viewing angles.*

*40. A non-transitory computer-readable medium having instructions stored thereon for causing a computing device to perform operations comprising:*

*recording an annular representation of a panorama;*

*storing the annular representation of the panorama as a digitized annular representation;*

*geometrically transforming the digitized annular representation of the panorama into a rectangular projection of the panorama by, at least in part, sampling the digitized annular representation with a dynamically changing sampling shape orientation, wherein the sampling shape orientation is dependent upon a horizontal viewing angle.*

*41. The non-transitory computer-readable medium of claim 40, wherein the instructions further cause the computing device to perform operations comprising displaying the rectangular projection of the panorama.*

*42. The non-transitory computer-readable medium of claim 40, wherein the sampling shape is proportional to a vertical viewing angle.*

*43. A non-transitory computer-readable medium having instructions stored thereon for causing a computing device to perform operations comprising:*

*instructions for recording the annular representation of a panorama;*

*instructions for storing the annular representation of the panorama as a digitized annular representation; and*

*instructions for geometrically transforming the digitized annular representation of the panorama into a cylindrical representation of the panorama.*

*44. The non-transitory tangible computer-readable medium of claim 43, wherein the instructions further cause the computing device to perform operations comprising displaying the cylindrical of the panorama.*

*45. The non-transitory computer-readable medium of claim 44, wherein the instructions further cause the computing device to perform operations comprising displaying the cylindrical representation of the panorama using a computer program running a QuickTime VR program.*

*46. The non-transitory computer-readable medium of claim 43, wherein the instructions further cause the computing device to perform operations comprising sampling the digitized annular representation with a dynamically changing sampling shape orientation.*

*47. The non-transitory computer-readable medium of claim 46, wherein the sampling shape orientation is dependent upon at least one of a horizontal viewing angle and a vertical viewing angle.*

*48. The non-transitory computer-readable medium of claim 43, wherein the instructions further cause the computing device to perform operations comprising storing the annular representation in a polar coordinate system.*

*49. The non-transitory tangible computer-readable medium of claim 48, wherein the instructions further cause the computing device to perform operations comprising converting the annular representation from the polar coordinate system to a cylindrical coordinate system.*

* * * * *